US010824799B2

(12) United States Patent
Gross et al.

(10) Patent No.: US 10,824,799 B2
(45) Date of Patent: Nov. 3, 2020

(54) SUMMARY DATA AUTOFILL

(71) Applicant: Microsoft Technology Licensing, LLC, Redmond, WA (US)

(72) Inventors: Christopher John Gross, Redmond, WA (US); Benjamin Edward Rampson, Woodinville, WA (US); Poornima Hanumara, Seattle, WA (US); Anupam Garg, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 76 days.

(21) Appl. No.: 14/319,580

(22) Filed: Jun. 30, 2014

(65) Prior Publication Data

US 2015/0378978 A1    Dec. 31, 2015

(51) Int. Cl.
*G06F 40/174*   (2020.01)
*G06F 40/177*   (2020.01)
*G06F 40/18*    (2020.01)

(52) U.S. Cl.
CPC .......... *G06F 40/174* (2020.01); *G06F 40/177* (2020.01); *G06F 40/18* (2020.01)

(58) Field of Classification Search
CPC .... G06F 17/243; G06F 17/245; G06F 17/246; G06F 40/18; G06F 40/177; G06F 40/174
(Continued)

(56) References Cited

U.S. PATENT DOCUMENTS 5,231,577 A   7/1993 Koss
5,598,519 A   1/1997 Narayanan
(Continued)

FOREIGN PATENT DOCUMENTS

CN   101105814 A   1/2008
CN   101158900 A   4/2008
(Continued)

OTHER PUBLICATIONS

"Create a PivotTable to analyze worksheet data", Published on: Mar. 29, 2013 Available at: http://office.microsoft.com/en-in/excel-help/create-a-pivottable-to-analyze-worksheet-data-HA102840046.aspx, 2 pages.
Translated Office Action in Chilean Patent Appln No. 2093-2013, dated Mar. 13, 2015, a counterpart foreign application of U.S. Appl. No. 13/014,520, 7 pages.
Office Action in Chinese Patent Appln No. 201210019215.9, dated Dec. 4, 2013, a counterpart foreign application of U.S. Appl. No. 13/014,520, 15 pages.
Office Action in Chinese Patent Appln No. 201210019215.9, dated Jul. 22, 2014, a counterpart foreign application of U.S. Appl. No. 13/014,520, 10 pages.
(Continued)

*Primary Examiner* — Stephen S Hong
*Assistant Examiner* — Nicholas Hasty
(74) *Attorney, Agent, or Firm* — Schwegman Lundberg & Woessner, P.A.

(57) ABSTRACT

Technologies are described herein for summary data autofill. A device executes an application program configured to receive data input. The application program may determine a portion of the data may be aggregated or conducive to being summarized. Upon the detection of a user input of additional data into a document having data contained therein, the application program may display a suggested complete summary of the data. An input may be received to accept the suggested complete summary, whereby the manner in which the suggested complete summary is displayed may be changed to indicate the acceptance of the suggested complete summary. A confidence level that the suggested complete summary is a correct summary of the data may be determined. The confidence level may be adjusted based on further input of data or additional data.

19 Claims, 10 Drawing Sheets

(58) Field of Classification Search
USPC .......................................................... 715/219
See application file for complete search history.

(56) References Cited

U.S. PATENT DOCUMENTS

| | | | |
|---|---|---|---|
| 5,613,131 | A | 3/1997 | Moss et al. |
| 5,621,875 | A | 4/1997 | Mason et al. |
| 5,701,499 | A | 12/1997 | Capson et al. |
| 5,778,402 | A | 7/1998 | Gipson |
| 5,805,158 | A | 9/1998 | Bertram et al. |
| 6,411,313 | B1 | 6/2002 | Conlon et al. |
| 6,640,234 | B1 | 10/2003 | Coffen et al. |
| 6,662,340 | B2 | 12/2003 | Rawat et al. |
| 6,697,999 | B1 | 2/2004 | Breuer et al. |
| 7,222,294 | B2 | 5/2007 | Coffen et al. |
| 7,225,200 | B2 | 5/2007 | Chickering et al. |
| 7,305,129 | B2 | 12/2007 | Chellapilla et al. |
| 7,343,551 | B1 | 3/2008 | Bourdev |
| 7,350,187 | B1 | 3/2008 | Tong et al. |
| 7,426,496 | B2 | 9/2008 | Kristjansson |
| 7,640,158 | B2 | 12/2009 | Detlef et al. |
| 7,689,904 | B2 | 3/2010 | Ritter |
| 7,707,486 | B2 | 4/2010 | Genesereth et al. |
| 7,827,483 | B2 | 11/2010 | Unbedacht et al. |
| 8,140,533 | B1 | 3/2012 | Elmeleegy et al. |
| 8,286,072 | B2 | 10/2012 | Chamberlain et al. |
| 8,577,704 | B2* | 11/2013 | Cannon ................. G06F 17/246 705/7.11 |
| 8,600,916 | B2 | 12/2013 | Chen et al. |
| 8,645,825 | B1 | 2/2014 | Cornea et al. |
| 8,819,574 | B2 | 8/2014 | Ouyang et al. |
| 2001/0018696 | A1 | 8/2001 | Hori et al. |
| 2002/0103825 | A1 | 8/2002 | Bauchot |
| 2004/0060001 | A1 | 3/2004 | Coffen et al. |
| 2005/0132280 | A1 | 6/2005 | Broman et al. |
| 2006/0007466 | A1 | 1/2006 | Ben-Yehuda et al. |
| 2006/0080594 | A1 | 4/2006 | Chavoustie et al. |
| 2006/0136808 | A1 | 6/2006 | Chirilov et al. |
| 2007/0061746 | A1 | 3/2007 | Folting et al. |
| 2007/0078872 | A1 | 4/2007 | Cohen |
| 2007/0101252 | A1 | 5/2007 | Chamberlain et al. |
| 2007/0106494 | A1 | 5/2007 | Detlef et al. |
| 2007/0130263 | A1 | 6/2007 | Li et al. |
| 2007/0250765 | A1* | 10/2007 | Chen ..................... G06F 17/246 715/234 |
| 2008/0114758 | A1 | 5/2008 | Rupp et al. |
| 2009/0089653 | A1 | 4/2009 | Campbell et al. |
| 2009/0150426 | A1 | 6/2009 | Cannon et al. |
| 2009/0282324 | A1* | 11/2009 | Patel ..................... G06F 17/248 715/212 |
| 2009/0319542 | A1 | 12/2009 | Le Brazidec et al. |
| 2010/0083086 | A1 | 4/2010 | Berger et al. |
| 2010/0257145 | A1 | 10/2010 | Felsheim |
| 2010/0257444 | A1 | 10/2010 | Bever et al. |
| 2010/0325173 | A1 | 12/2010 | Haley et al. |
| 2011/0010324 | A1 | 1/2011 | Bolivar et al. |
| 2011/0025516 | A1* | 2/2011 | Johnson .............. G06F 17/2705 340/657 |
| 2011/0066933 | A1 | 3/2011 | Ludwig |
| 2011/0209048 | A1 | 8/2011 | Scott et al. |
| 2011/0320230 | A1 | 12/2011 | Podgurny et al. |
| 2012/0159297 | A1 | 6/2012 | Peters |
| 2012/0192051 | A1 | 7/2012 | Rothschiller et al. |
| 2012/0198322 | A1 | 8/2012 | Gulwani et al. |
| 2013/0086460 | A1 | 4/2013 | Folting et al. |
| 2013/0110792 | A1* | 5/2013 | Hudis ..................... G06F 16/22 707/692 |
| 2013/0124960 | A1* | 5/2013 | Velingkar .............. G06F 16/20 715/220 |
| 2013/0124962 | A1 | 5/2013 | Mitchell |
| 2013/0145244 | A1* | 6/2013 | Rothschiller ......... G06F 17/246 715/212 |
| 2013/0151939 | A1* | 6/2013 | Proux .................... G06F 17/246 715/212 |
| 2013/0191714 | A1 | 7/2013 | Rothschiller et al. |
| 2014/0188925 | A1 | 7/2014 | Skolicki |
| 2014/0372857 | A1 | 12/2014 | Otero et al. |

FOREIGN PATENT DOCUMENTS

| | | |
|---|---|---|
| CN | 101661512 A | 3/2010 |
| CN | 102999561 A | 3/2013 |
| EP | 2506155 A1 | 10/2012 |
| TW | 498221 B | 8/2002 |
| TW | 561371 B | 11/2003 |
| TW | 200939052 A | 9/2009 |
| TW | I382342 B | 1/2013 |

OTHER PUBLICATIONS

Office Action in Columbian Patent Appln No. 13-176231, dated Jul. 9, 2014, a counterpart foreign application of U.S. Appl. No. 13/014,520, 6 pages.

"Data Cleansing and Correction with Data Rules," Published on Oct. 19, 2010, available at: http://download.oracle.com.docs/cd/E11882_01/owb.112/e10935/data_cleansing.htm#CEGBEBDE, 10 pages.

Eager et al., "Lixto Online Market Intelligence," Published Jul. 2008, Available at: http://www.lizto.com/wp-content/uploads/2010/03/Butler_TechnologyAudit_2008.pdf, 9 pages.

"Excel Functions," Published on: Apr. 10, 2008, Available at: http://www.baycongroup.com/excel2007/03_excel.htm, 11 pages.

French et al., "Excel 2007 AutoFormat," Published on: Oct. 19, 2010, Available at: http://spreadsheets.about.com/od/excelformatting/qt/090905-excel-autoformatting.htm, 2 pages.

Greathouse, "Combining and splitting data in spreadsheets—Google Tech Tips," Published Nov. 17, 2011, Available at: https://sites.google.com/a/slu.edu/tips/home/combiningandsplittingdatainspreadsheets, 3 pages.

Gulwani, "Automating String Processing in Spreadsheets Using Input-Output Examples," Jan. 26-28, 2011, Microsoft Research, PoPL '11, Austin, TX, ISA, 13 pages.

Haliestinson, "Flash-fill in Microsoft Excel 2013," Published on: Apr. 16, 2013, Available at: http://blog.directionstraining.com/microsoft-excel/flash-fill-in-microsoft-excel-2013, 4 pages.

Hanns, "Tips for populating cells in excel using auto fill," Published on Jul. 14, 2011, Available at: http://ittrainingtips.iu.edu/excel/tips-for-populating-cells-in-excel-using -auto-fill/07/2011, 2 pages.

Harris et al., "Spreadsheet Table Transformations from Examples", Proceedings of the 32nd ACM Sigplan Conference on Programming Language Design and Implementation, PLDI '11, Jun. 4, 2011 (2011-06-Q4), pp. 317-328.

Igarashi et al., "Fluid visualization of spreadsheet structures," Sep. 1998, In Proceedings of the IEEEE Symposium on Visual Languages, pp. 118-125, 8 pages.

PCT Search Report & Writtten Opintion for Application No. PCT/US2014/040202, dated May 29, 2015, 14 pages.

PCT Search Report & Writtten Opintion for Application No. PCT/US2012/0022454, dated Jul. 27, 2012, 9 pages.

PCT Search Report & Written Opinion for Application No. PCT/US2015/037846, dated Sep. 28, 2015, 14 pages.

Leete, "Free software: autofilling cells in openoffice.org calc," Published on Nov. 9, 2011, Alailable at: http://ww.dummies.com/how-to/free-software-autofilling-cells-in-openoffice-c, 3 pages.

Lowell, "How to use autofill on a Google docs spreadsheet," Published on: Apr. 28, 2010, Available at: http://www.howtogeek.com/howto/15799/how-to-use-autofill-on-a-google-docs-spreadsheet-quick-tips, 4 pages.

Mott et al., "How to auto populate the date in excel," Published on: Apr. 26, 2013, Avaiable at: http//smallbusiness.chron.com/auto-populate-date-excel-40253.html, 3 pages.

Nangpooh, MS Excel tutorial—Creating custom lists to auto fill rows and columns, Published on: Mar. 14, 2013, Available at: http://vaossa.info/?p=26, 4 pages.

Office Action in New Zealand Patent Appln No. 613143, dated Mar. 7, 2014, a counterpart foreign application of U.S. Appl. No. 13/014,520, 2 pages.

(56) References Cited

OTHER PUBLICATIONS

Office Action from the U.S. Patent and Trademark Office for U.S. Appl. No. 13/014,520, dated Jan. 30, 2015, 18 pages.
Office Action from the U.S. Patent and Trademark Office for U.S. Appl. No. 13/358,033, dated Jan. 9, 2014, 20 pages.
Office Action from the U.S. Patent and Trademark Office for U.S. Appl. No. 13/014,520, dated Oct. 8, 2015, 18 pages.
Office Action from the U.S. Patent and Trademark Office for U.S. Appl. No. 13/014,520, dated Dec. 11, 2012, 19 pages.
Office Action from the U.S. Patent and Trademark office for U.S. Appl. No. 13/358,033, dated Dec. 18, 2015, 18 pages.
Office Action from the U.S. Patent and Trademark Office for U.S. Appl. No. 13/358,033, dated Apr. 8, 2015, 19 pages.
Office Action from the U.S. Patent and Trademark Office for U.S. Appl. No. 13/014,520, dated Jun. 26, 2012, 27 pages.
Office Action from the U.S. Patent and Trademark Office for U.S. Appl. No. 13/014,520, dated Aug. 14, 2013, 16 pages.
Office Action from the U.S. Patent and Trademark Office for U.S. Appl. No. 13/358,033, dated Sep. 12, 2014, 18 pages.
Office Action from the U.S. Patent and Trademark Office for U.S. Appl. No. 13/918,878, dated Sep. 29, 2015, 22 pages.
Office Action in Phillippines Patent Appln No. 2PH/1/2013/501506, dated Aug. 19, 2014, a counterpart foreign application of U.S. Appl. No. 13/014,520, 2 pages.
Rad, "Conditional formatting rules simplified,"Published on: Apr. 22, 2010, Availabel at: http://blogs.msdn.com/b/excel/archive/2010/04/22/conditional-formatting-rules-simplified.aspx, 7 pages.
Stinson et al., "Working with external data," in Book—Microsoft Office Excel 2003 Inside Out, Chapter 29, Jan. 1, 2004, pp. 757-763.
Office Action in Taiwan Patent Appln No. 100149580, dated Apr. 29, 2014, a counterpart foreign application of U.S. Appl. No. 13/014,520, 12 pages.
Office Action in Taiwan Patent Appln No. 100149580, dated Sep. 18, 2014, a counterpart foreign application of U.S. Appl. No. 13/014,520, 7 pages.
"Use Automatic Formatting as you Type," Published on: Oct. 19, 2010, Available at: http://office.microsoft.com/en-in/excel-help/use-automatic-formatting-as-you-type-HP010082297.aspx, 3 pages.
"Using Excels Autofill," Publishe on: Apr. 7, 2013, Available at: http://askaexcelninja.wordpress.com/2013/04/07/using-excels-autofill/, 3 pages.
"Visulaizing data using conditional formatting," Jan. 1, 2007, in Excel 2007 Bible, Chapter 21, 3 pages.
Walkenbach, J., "Visualizing Data Using Conditional Formating," in Excel 2007 Bible, 2007, Wiley Publishing Inc. Chapter 21, pp. 421-440, 22 pages.
PCT International Preliminary Report on Patentability for Application No. PCT/US2015/037846, dated Jun. 9, 2016, 7 pages.
"Office Action Issued in Chinese Patent Application No. 201580035909.3", (w/ Concise Statement of Relevance), dated Jan. 23, 2019, 15 Pages.
"Second Office Action Issued in Chinese Patent Application No. 201580035909.3", dated Oct. 14, 2019, 09 Pages.

\* cited by examiner

FIG. 3B

| | A | B | C | D | E | F | G | H | I | J | K | L |
|---|---|---|---|---|---|---|---|---|---|---|---|---|
| 1 | | | | | | | | | | | | |
| 2 | | | | | | | | | | | | |
| 3 | | PERSON | ORDER | | | | | | | | | |
| 4 | | LARRY | BEEF | | | | BEEF 3 | | | | | |
| 5 | | JANICE | CHICKEN | | | | CHICKEN 3 | | | | | |
| 6 | | PAULA | BEEF | | | | LAMB 2 | | | | | |
| 7 | | BONNIE | CHICKEN | | | | VEGGIE 2 | | | | | |
| 8 | | ALYSSA | VEGGIE | | | | TOTAL 10 | | | | | |
| 9 | | ETHEL | LAMB | | | | | | | | | |
| 10 | | NORA | BEEF | | | | | | | | | |
| 11 | | RANDY | VEGGIE | | | | | | | | | |
| 12 | | APRIL | CHICKEN | | | | | | | | | |
| 13 | | LUCAS | LAMB | | | | | | | | | |
| 14 | | | | | | | | | | | | |
| 15 | | | | | | | | | | | | |

FIG. 3C

| | FILE | HOME | INSERT | FORMULAS | REVIEW | VIEW | | | | | |
|---|---|---|---|---|---|---|---|---|---|---|---|
| | A | B | C | D | E | F | G | H | I | J | K | L |
| 1 | | | 108 | | | | | | | | | |
| 2 | | | | | | | 322 | | | | | |
| 3 | | PERSON | ORDER | | | | | | | | | |
| 4 | | LARRY | BEEF | | | BEEF | 3 | | | | | |
| 5 | | JANICE | CHICKEN | | | CHICKEN | 3 | | | | | |
| 6 | | PAULA | BEEF | | | LAMB | 2 | | | | | |
| 7 | | BONNIE | CHICKEN | | | VEGGIE | 2 | | | | | |
| 8 | | ALYSSA | VEGGIE | | | TOTAL | 10 | | | | | |
| 9 | | ETHEL | LAMB | | | | | | | | | |
| 10 | | NORA | BEEF | | | | | | | | | |
| 11 | | RANDY | VEGGIE | | | | | | | | | |
| 12 | | APRIL | CHICKEN | | | | | | | | | |
| 13 | | LUCAS | LAMB | | | | | | | | | |
| 14 | | | | | | | | | | | | |
| 15 | | | | | | | | | | | | |

FIG. 3D

SUMMARY DATA AUTOFILL

BACKGROUND

The integration of data into documents has become a useful way to record and disseminate information. Various types of document formats exist to provide a user with the ability to record, present, and share data. Various types of documents may include, but are not limited to, spreadsheets, word processors, html files, and the like. The capabilities provided to a user in conventional document programs often vary. In some implementations, pivot tables may be used. A pivot table is a data tool that displays various results of data calculations in a table (i.e. the pivot table) that is separate from the original data.

It is with respect to these and other considerations that the disclosure made herein is presented.

SUMMARY

Technologies are described herein for summary data autofill. In accordance with the technologies disclosed herein, a device executes an application program, such as a spreadsheet application, that may be configured to receive input data. The application may be further configured to execute an aggregation determination module. The aggregation determination module may be configured to analyze the data to determine if the data may be summarized. The aggregation determination module may also be configured to analyze additional data to determine if the additional data is a summary (or the initiation of a summary) of the data. The determination as to whether the additional data is a summary of the initial data may be performed in response to user input in some configurations.

The application may also be configured to execute an aggregator that generates one or more previews of suggested complete summaries of the data to augment the additional data. The preview is in a form of a pivot table in some configurations. In some configurations, upon the selection of the preview, the data may be configured for use as a pivot table.

Once selected, the preview may be displayed in a format that indicates that the preview has been selected or accepted. In one implementation, the format may be in a manner consistent with the additional data. For example, the font, size, shape, and/or shading of the preview may be modified such that it is consistent with the additional data and/or the data.

The application may be additionally configured to compute a confidence level associated with the suggested complete summary of the additional data. The application may modify the preview based upon the confidence level determined for the suggested complete summary. In some configurations, the confidence level may be updated in response to receiving additional data. In further configurations, the preview may be updated in response to updating the confidence level.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A-3E are user interface diagrams showing aspects of user interfaces for enabling summary data autofill, according to various configurations described herein.

DETAILED DESCRIPTION

Figure 1:
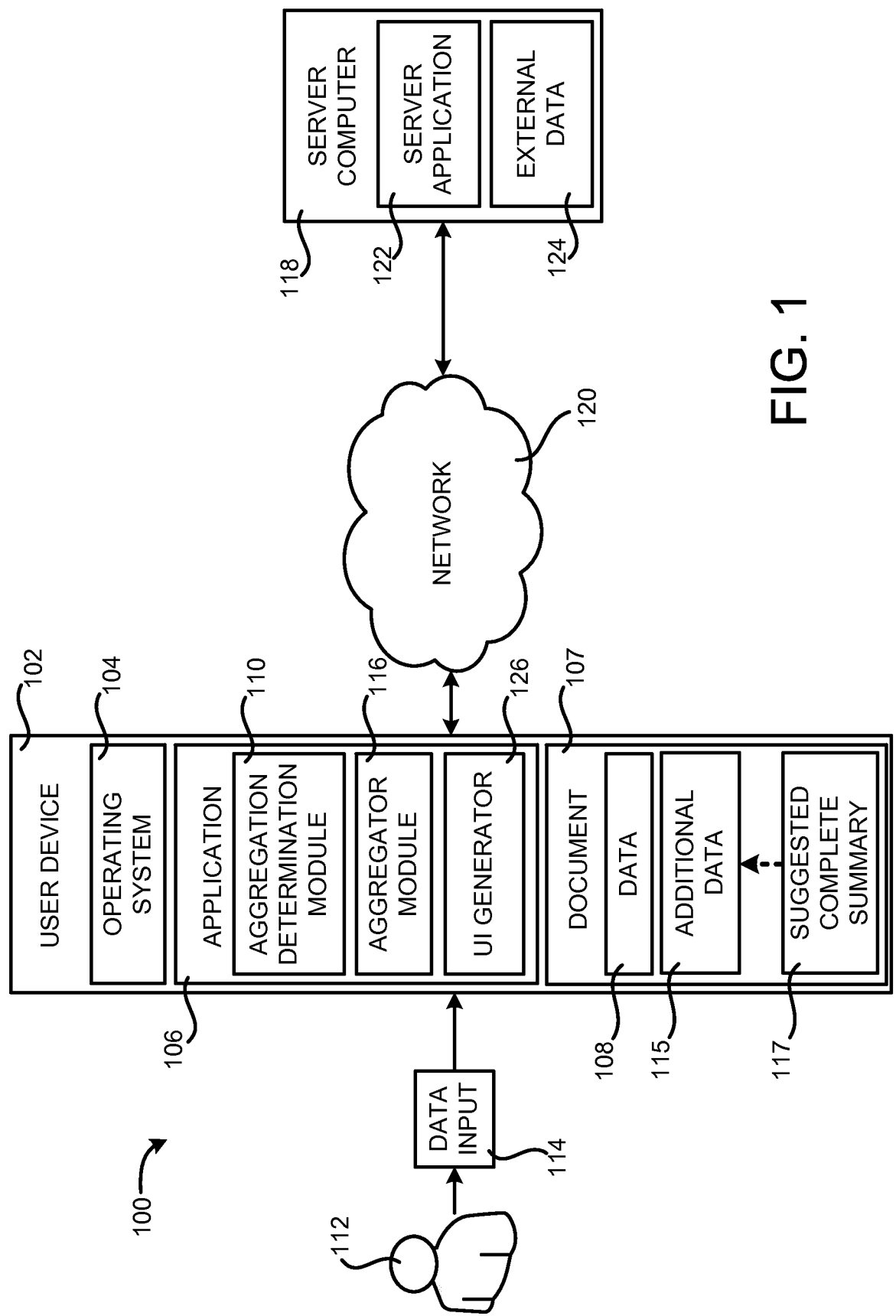
FIG. 1 is a system diagram illustrating an illustrative operating environment for the various technologies disclosed herein.

The following detailed description is directed to technologies for summary data autofill. As used herein, the term "auto fill" (which might also be referred to herein as "flash fill") generally means that data is rendered in one portion of a document in response to the entry of additional data in another portion of the same or different document. According to various implementations, summary data autofill includes technologies for the rendering of suggested summaries (which might also be referred to herein as "aggregations") of data.

In accordance with the technologies disclosed herein, a device, such as a user computing device or a server computer, executes an application program that may be configured to receive an initial data input. For example, a spreadsheet program may receive initial tabular data into one or more columns of a spreadsheet document in one configuration. The application may be further configured to execute an aggregation determination module. The aggregation determination module may be configured to analyze the initial data and determine if the initial data may be conducive for summarization (i.e. is summarizable). The aggregation determination module may also be configured to analyze additional data input to determine if the additional data is a summary of the initial data. For example, a user might input additional data into the same spreadsheet document that is the start of a summary of the data.

The determination as to whether the additional data is the start of a summarization of the initial data may be performed in response to user input. This determination might also be performed in an automated fashion that does not require user input. In response to determining that the additional data is the start of a summarization of the initial data, the document may be "flash filled" with a suggested complete summary of the initial data. For example, a suggested complete summary of the initial data may be presented to a user in an appropriate user interface. A user may then select the suggested complete summary, whereby the suggested complete summary is presented to indicate the suggested complete summary has been accepted.

In some configurations, the selection of the suggested complete summary will cause a pivot table to be inserted into the document in place of the additional data. The pivot table may include the suggested complete summary of the initial data. In this example, a user (or other entity) may input additional data. Various implementations may analyze the additional data, determine that the additional data is the commencement of a summarization of the data, and provide a suggested complete summary of the data. In addition, various implementations may organize the suggested complete summary to provide a pivot table. A user may select the suggested complete summary, whereby the additional data and the suggested complete summary are replaced with the pivot table summarizing the data.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific examples. Referring now to the drawings, in which like numerals represent like elements throughout the several figures, aspects of technologies for summary data autofill will be presented.

Referring now to FIG. 1, aspects of one operating environment 100 for the various technologies presented herein will be described. The operating environment 100 shown in FIG. 1 includes a user device 102. According to various configurations, the functionality of the user device 102 can be provided by a personal computer ("PC") such as a desktop, tablet, or laptop computer system. In some other configurations, the functionality of the user device 102 can be provided by other types of computing systems including, but not limited to, a handheld computer, a netbook computer, an embedded computer system, a mobile telephone, a smart phone, or another computing device.

Various aspects of the user device 102 are illustrated and described below, particularly with reference to FIGS. 4-6. Although the functionality of the user device 102 is primarily described herein as being provided by a tablet or slate computing device, a smartphone, or a PC having a touch-sensitive display, because the functionality described herein with respect to the user device 102 can be provided by additional and/or alternative devices, it should be understood that these examples are illustrative, and should not be construed as being limiting in any way.

The user device 102 can be configured to execute an operating system 104 and an application 106. The operating system 104 is a computer program for controlling the operation of the user device 102. The application 106 is an executable program configured to execute on top of the operating system 104 to provide various functions. According to various implementations, the application 106 includes, but is not limited to, spreadsheet programs, word processing programs, and the like. The application 106 may be configured to generate a document 107. The application 106 can be configured to receive data 108, to execute various operations with respect to the data 108, or to render various views of the data 108 in a user interface, such as a screen display 300 of FIGS. 3A-3E, in the document 107.

According to various configurations, the application 106 may be a suitable spreadsheet program, such as GOOGLE DOCS from Google Inc. in Mountain View, Calif., or NUMBERS for MAC from Apple Inc. in Cupertino, Calif. In further configurations, the data 108 corresponds to an HTML file, an XML file, other types of files, and/or various scripts such as, for example, JAVASCRIPT, and/or other web-based file formats or executable code that, when executed and/or rendered by the application 106, represent various files. According to some implementations, the files represented by the data 108 can include, but are not limited to, a file in a web-based format for representing spreadsheets, workbooks, tables, grids, or other types of files. Because the data 108 can include data in the above-described, as well as other formats, it should be understood that the above examples are illustrative, and should not be construed as being limiting in any way. In one contemplated configuration, the data 108 corresponds to spreadsheet data or another type of data in other grid-based or tabular formats.

The data 108 can be stored at the user device 102 in a memory or other data storage device associated with the user device 102. In other configurations, the data 108 is obtained from a data source such as a database, a network storage device, or another data storage device such as a server computer that is operating as part of, or in communication with, a network, described in more detail below. Because the data 108 can be obtained from almost any source, it should be understood that the configuration in which the data 108 is obtained from the user device 102 is illustrative and should not be construed as being limiting in any way.

The application 106 might also be configured to execute an aggregation determination module 110. The aggregation determination module 110 may perform various functions within the application 106. In some configurations, the application 106 may execute the aggregation determination module 110 upon the initialization (i.e. initial execution) of the application 106. The aggregation determination module 110 may analyze the data 108 as it is received by the application 106 and rendered in the document 107. The analysis performed by the aggregation determination module 110 may involve a determination as to whether or not the data 108 is capable of or conducive to being summarized.

As used herein, summarization may involve various processes. For example, the aggregation determination module 110 may determine that the data 108 is conducive to being summarized because a sum or other mathematical calculation may be performed on the data 108. For instance, the data 108 may include two of the same entries, e.g. "BEEF". The aggregation determination module 110 may determine that at least that portion of the data 108 is conducive for summarization because the number of entries of BEEF may be counted.

In another example, the aggregation determination module 110 may determine that the data 108 is conducive to being summarized because at least a portion of the data 108 may be categorized. For instance, the data 108 may include two or more entries with different states, e.g. GEORGIA and WASHINGTON. The aggregation determination module 110 may determine that at least that portion of the data 108 is conducive for summarization because the entries, GEORGIA and WASHINGTON, may be categorized as STATES. These and other types of summarization methods may be used, and are considered to be within the scope of the presently disclosed subject matter.

The aggregation determination module 110 may also be configured to execute upon the entry by a user of various parts of the data 108. For example, a user 112 may enter a data input 114 into the user device 102 for use in the application 106. The user 112 may enter the data input 114 as the data 108 in the document 107. The user 112 may thereafter enter additional data 115. The additional data 115 may be a separate entry of data from the data 108. The aggregation determination module 110 may analyze the additional data 115 against the data 108.

The analysis of the additional data 115 against the data 108 may be performed to determine if the additional data 115 may be augmented, modified, or replaced by summarizing at least a portion of the data 108. For example, the data 108 may contain two columns of data. The first column may include a first row with a data entry of "CAR" and a second row with the data entry of "BUS." The second column may include the data entry of "32,000" in the first row and the data entry of "60,000" in the second row. A user may enter "VEHICLE" in the additional data 115. The aggregation determination module 110 may analyze the entry of VEHICLE and determine that VEHICLE is a term that collectively incorporates both CAR and BUS. Thus, the data aggregation module 110 may determine that the VEHICLE entry in the additional data 115 may represent an intent by the user 112 (or other entity) to create a summary of the data 108.

If it is determined that the additional data 115 may be the initiation of a summary of the data 108, the application 106 may execute the aggregator module 116. The aggregator module 116 may be configured to analyze the data 108 and generate a suggested complete summary 117 of the data 108 to complete the summary commenced by the entry of the additional data 115. The suggested complete summary 117 generated by the aggregator module 116 may be various calculations or categorizations of the data 108. In one implementation, the suggested complete summary 117 may be based on the data 108. In another implementation, the suggested complete summary 117 may be based on another data source. For example, the application 106 may be operative to generate the suggested complete summary 117 by communicating with a server computer 118 through a network 120.

As shown in FIG. 1, the server computer 118 may execute a server application 122. The server application 122 may be configured to receive queries from the application 106 regarding the suggested complete summary 117 of the data 108. For example, the application 106 may query the server application 122 to determine possible categories of items in the data 108 (e.g. CAR and BUS categorized as VEHICLES). In response to a query, the server application 122 may access external data 124. The external data 124 may be one or more data stores in which data may be stored and searched.

In response to generating the suggested complete summary 117, the application 106 may execute a user interface ("UI") generator 126. The UI generator 126 may be configured to generate one or more UIs relating to the suggested complete summary 117. The UIs can include a user interface for viewing the data 108, for supporting interactions by the user 112 with the data 108, to allow the user 112 to interact with the application 106 executed by the user device 102, and/or to support viewing and/or otherwise interacting with the data 108. The UIs can include various application-specific and/or device-specific menus, soft buttons, and/or other types of controls for controlling the application 106, for interacting with the data 108, and/or for interacting with or controlling other applications or resources associated with and/or accessed by the user device 102.

According to some configurations in which the data 108 corresponds to a spreadsheet or workbook file, the UIs also can display worksheet data, a column header, a row header, and/or other worksheet and/or spreadsheet elements. These and/or other elements of the UIs can be configured as container elements wrapping actual content corresponding to the displayed elements. For example, as generally is understood, a table or spreadsheet can be generated in HTML or XML using one or more HTML <div> tags to create sections, rows, columns, or other table or spreadsheet elements. Furthermore, containers can be used to constrain an area of a display screen or display space on which the rendered data 108 is to be displayed, and can hide data that exceeds the containers. Because generation of the document 107 in the form of a spreadsheet and/or table in HTML is generally understood, the data 108 is not described in additional detail herein.

In one configuration, the user 112 may utilize an appropriate user input device to select the suggested complete summary 117. In some instances, more than one suggested complete summary 117 may be generated. In those instances, the user 112 may be presented with a UI to select one of the suggested complete summaries 117. In another configuration, the aggregator module 116 may modify the suggested complete summary 117 based on additional entered data, which is referred to herein as additional data 115. These and other aspects are illustrated and described below with reference to FIGS. 3A-3E.

FIG. 1 illustrates one user device 102, one network 120, and one server computer 118. It should be understood, however, that some implementations of the operating environment 100 include multiple user devices 102, multiple networks 120, and/or multiple server computers 118. Also, FIG. 1 illustrates the application 106, and other modules and generators, as being executed by the operating system 104 of the user device 102. It should be understood, however, that various aspects of the operating environment 100 may be provided using computing resources other than the user device 102. In one specific example, the processes associated with the application 106 and the document 107 may be executed using a remote computer, such as the server computer 118. In this example, the document 107 may be viewed, modified and otherwise interacted with through a Web browser application. Thus, the illustrated configuration should be understood as being illustrative, and should not be construed as being limiting in any way.

Figure 2:
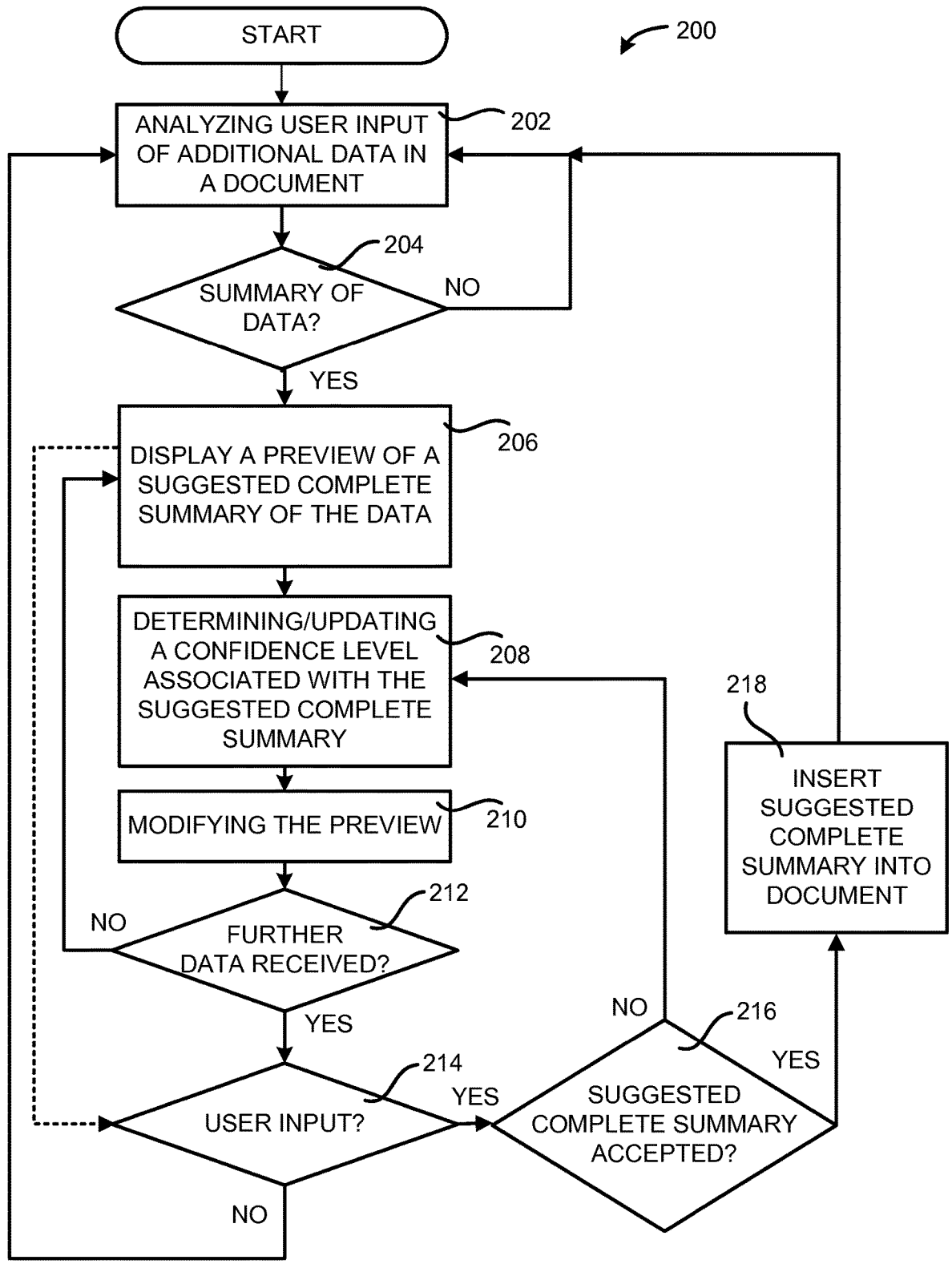
FIG. 2 is a flow diagram showing aspects of a method for summary data autofill.

Turning now to FIG. 2, aspects of a method 200 for summary data autofill will be described in detail. It should be understood that the operations of the method 200 are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 200 can be ended at any time and need not be performed in its entirety. Some or all operations of the method 200, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein can be implemented as a sequence of computer implemented acts or program modules running on a computing system, and/or as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the technologies of the present disclosure, the method 200 disclosed herein is described as being performed by the user device 102 via execution of computer executable instructions such as, for example, the application 106. As explained above, the application 106 can include functionality for providing the aggregation determination module 110, the aggregator module 116, or the UI generator 126. As such, while the method 200 is described as being provided by the user device 102, it should be understood that the user device 102 can provide the functionality described herein via execution of various application program modules and/or elements. Additionally, devices other than, or in addition to, the user device 102 can be configured to provide the functionality described herein via execution of computer executable instructions other than, or in addition to, the aggregation determination module 110, the aggregator module 116, or the UI generator 126. As such, it should be understood that the described configuration is illustrative, and should not be construed as being limiting in any way.

The method 200 begins at operation 202, where the application 106, or components thereof, analyzes the input (data input 114) provided by the user 112 (or other entity) of the data 108 in a document. As mentioned above, a document may have data 108 contained therein (described in more detail in the FIGS. 3A-3E, below). The data 108 may be information received from the user 112 as the data input 114, or may be data retrieved from various sources, such as an external data source (i.e. the external data 124). The user 112 may also input additional data 115. The additional data 115 may be additional information received from the user 112 as the data input 114, or may be data retrieved from various sources, such as the data 108 or the external data 124. In some configurations, portions of the data 108 and/or the additional data 115 may be stored in different data stores than other portions of the data 108 and/or the additional data 115.

The method 200 continues to operation 204, where the application 106 determines if the additional data 115 may be a summary, or partial summary, of the data 108. The application 106 may perform the operation 204 upon the entry of the additional data 115 or upon a different prompt. For example, the application 106 may perform the operation 204 if an input is received, such as the selection of a feature within the application 106, to indicate that a summarization is to occur with the entry of the additional data 115. The application 106 may determine that the additional data 115 represents the beginning of a summary of the data 108 based on various levels of data entry. For example, a single data point in the additional data 115 may indicate that the additional data 115 is a summary, or the start of a summary, of a least a portion of the data 108.

In an alternate implementation, summary data may be calculated in anticipation of, or prior to, operation 204. For example, at operation 201, the application 106 may commence a calculation operation that calculates one or more possible summaries of the data 108. The possible summaries may be used in other operations, including operation 204. In some implementations, the use of previously calculated summaries may increase efficiency. In another example, the application 106 may calculate summaries upon the entry of the data 108. The summaries may be updated, amended, or removed based on the entry of the additional data 115.

If the application 106 determines, in operation 204, that the additional data 115 is not a summary, or the start of a summary, of the data 108, the method 200 may return to operation 202. The application 106 may then again analyze the input by the user 112 of additional data 115 in the document 107. As such, execution of the method 200 can, but does not necessarily, repeat or pause at operation 204 until the application 106 determines, at operation 204, that the additional data 115 is a start of a summarization of at least a portion of the data 108. If the application 106 determines, in operation 204, that the additional data 115 is the beginning of a summarization of at least a portion of the data 108, the method 200 may proceed to operation 206. It should be appreciated that the method 200 may continue from operation 204 in other ways as well, all of which are considered to be within the scope of the presently disclosed subject matter.

At operation 206, the application 106 may cause the user device 102 to display a preview of a suggested complete summary 117 of the data 108. The suggested complete summary 117 may be used to augment, replace, or modify the additional data 115. The suggested complete summary 117 may be data anticipated by the application 106 to complete the summary commenced by the receipt of the additional data 115. The suggested complete summary 117 may be presented as some or all of the data 108 in summary form. The suggested complete summary 117 may also be data received from various secondary data sources, such as the external data 124. The suggested complete summary 117 may be displayed automatically without user action, which may be referred to herein as a "flash fill."

The preview of the suggested complete summary 117 may take various forms. For example, the preview may be presented as data added to the additional data 115 and displayed in a manner similar to the manner in which the additional data 115 is displayed. The preview may also be presented in a manner that indicates that the suggested complete summary 117 is prospective in nature. For example, the suggested complete summary 117 may be displayed with shading, styling or another type of visual effect that differentiates the appearance of the suggested complete summary 117 from the additional data 115. In some implementations, the preview of the suggested complete summary 117 may be modified for various reasons, such as based upon a confidence level as discussed in greater detail below. In some configurations, however, a confidence level is not determined. Thus, in those configurations, the method 200 may proceed from operation 206 to operation 214, described in more detail below.

The method 200 continues to operation 208, wherein a confidence level associated with the suggested complete summary 117 is determined. In some implementations, a confidence level may be used to determine a probability that the suggested complete summary is correct. The confidence level may be calculated using various technologies. For example, the confidence level may be calculated using other previously generated suggested summaries 117 that have been accepted by a user. In another example, the confidence level may be calculated based on the data 108 or the additional data 115. For example, if the additional data 115 is at an early stage of completion, the confidence level may be relatively low because of a lower number of data points useable to create the suggested complete summary 117. In another example, if the additional data 115 contains a relatively large number of data points, possibly including summary data, the confidence level may be relatively high. In some implementations, operation 208 may be performed prior to operation 206 to determine if a suggested summary has at least a certain confidence level to display to a user.

As mentioned above, the preview may be adjusted based on the confidence level. In this manner, the method 200 may proceed to operation 210, where the preview is modified based on the confidence level. The modification of the preview may take various forms. For example, a low confidence level may result in the display of text in one color (or shading), whereas a high confidence level may result in the display of text in another color (or different shading). These and other visual attributes may be utilized to modify the preview.

The method 200 may proceed to operation 212, where a determination is made as to whether further data is received as the data 108 or the additional data 115. The data may be any data or input that may affect the suggested complete summary 117. An example may be data added by a user to the data 108 or the additional data 115. Another example of additional data may be a modification of data associated with the data 108 or the additional data 115. A still further example may be the removal or deletion of data associated with the data 108 or the additional data 115.

If the application 106 determines, in operation 212, that further data has not been received, the method 200 can pause at operation 212 or, as illustrated in FIG. 2, return to operation 206. The application 106 may continue to display the preview of the suggested complete summary 117. As such, execution of the method 200 can, but does not necessarily, repeat or pause at operation 212 until the application 106 determines, at operation 212, that further data has been received. As noted above, the further data may be data added to the data 108 or data added to the additional data 1115. If the application 106 determines, at operation 212, that further data has been received, the method 200 may proceed to operation 214. It should be appreciated that the method 200 may continue from operation 212 in other manners as well, all of which are considered to be within the scope of the presently disclosed subject matter.

At operation 214, the application 106 may determine that a user input has been received. In some examples, the user input may be a selection or indication by the user 112 that the suggested complete summary 117 is correct. In another example, the user input may be a selection of one or more suggested complete summaries 117. Until the application 106 receives a user input, the method 200 may either pause at operation 214, whereby the application 106 waits for a user input, or the method 200 may repeat at operation 202, where the analysis is recommenced. It should be appreciated that the method 200 may continue from operation 214 in other manners as well, all of which are considered to be within the scope of the presently disclosed subject matter.

At operation 216, if the application 106 determines that the user input of operation 214 is an acceptance of the suggested complete summary 117, the application may proceed to operation 218. At operation 218, the application 106 inserts the suggested complete summary 117 that was accepted into the document 107. As described above, the suggested complete summary 117 may be inserted into the document 107 by replacing at least a portion of the additional data 115 with the suggested complete summary 117, adding the data indicated in the suggested complete summary 117 to the additional data 115, or modifying the additional data 115 to a structure such as a pivot table. In some implementations, operation 216 may by default present the suggested complete summary 117 as accepted. In this implementation, the user may cancel the acceptance (e.g. an opt-out process).

At operation 216, if the application 106 determines that the user input received at operation 214 is not an acceptance of the suggested complete summary 117, the method 200 may continue to operation 208, where the confidence level may be updated. As mentioned above, a change in the confidence level may cause the method 200 to continue to operation 210, where the preview is modified. The method 200 may continue or may end at various operations. As such, the method 200 can end or the method 200 can be repeated any number of times.

Figure 3A:
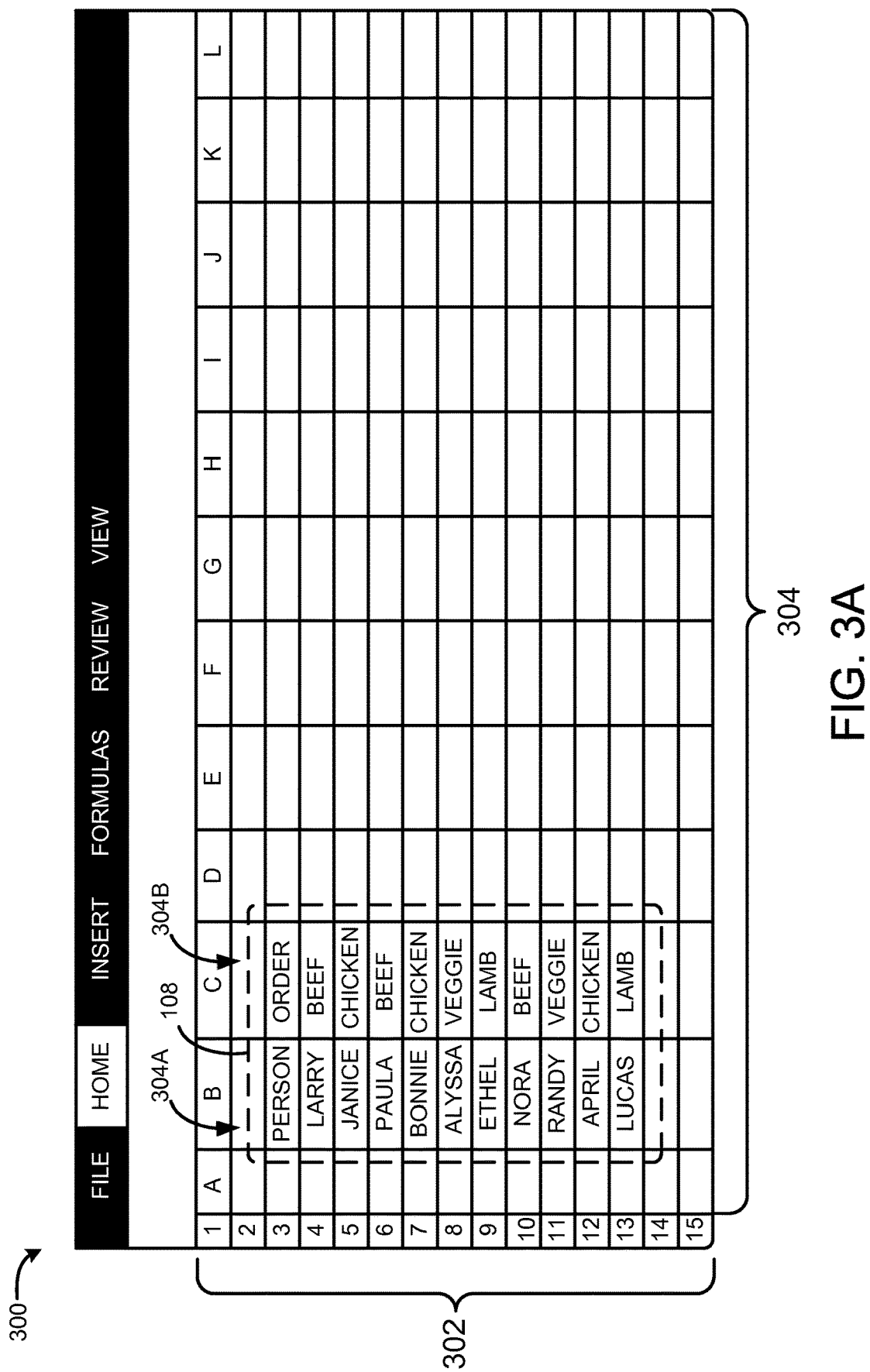

Turning now to FIGS. 3A-3E, several UI diagrams showing various aspects of the technologies disclosed herein for summary data autofill will be described according to various illustrative configurations. In particular, FIG. 3A shows an illustrative screen display 300 generated by a device such as the user device 102. As shown in FIG. 3A, the screen display 300 can include a representation of a spreadsheet generated by the application 106. In particular, the screen display 300 is illustrated as including a representation of a spreadsheet included in the data 108. It should be understood that this configuration is illustrative, and should not be construed as being limiting in any way.

As shown in FIG. 3A, the screen display 300 can include rows 302 and columns 304. Data 108 may be displayed in the screen display 300. The data 108 may be received from various sources such as, but not limited to, the data input 114 from the user 112 or the external data 124 from the server computer 118. The data 108 may also be data generated from other data (such as a function applied to other data). These and other examples are considered to be within the scope of the present disclosure.

As discussed above, the application 106 may determine whether the data 108 is in a format or form that is conducive to summarization. As can be observed upon a review of the data 108, the data 108 may be summarized in various ways. For example, the data 108 in column 304A may be summarized by the number of individuals, the number of men, the number of women, and the like. In a similar manner, the data 108 in column 304B may be summarized by the number of each individual item, the number of meat versus vegetable entrees, and the like.

In some configurations, the application 106 may analyze the data 108 as it is entered. In other configurations, the application 106 may analyze the data 108 upon the receipt of an instruction to summarize the data. For example, the application 106 may analyze the data upon the entry of the additional data 115, illustrated and described by way of example in FIG. 3B.

Figure 3B:
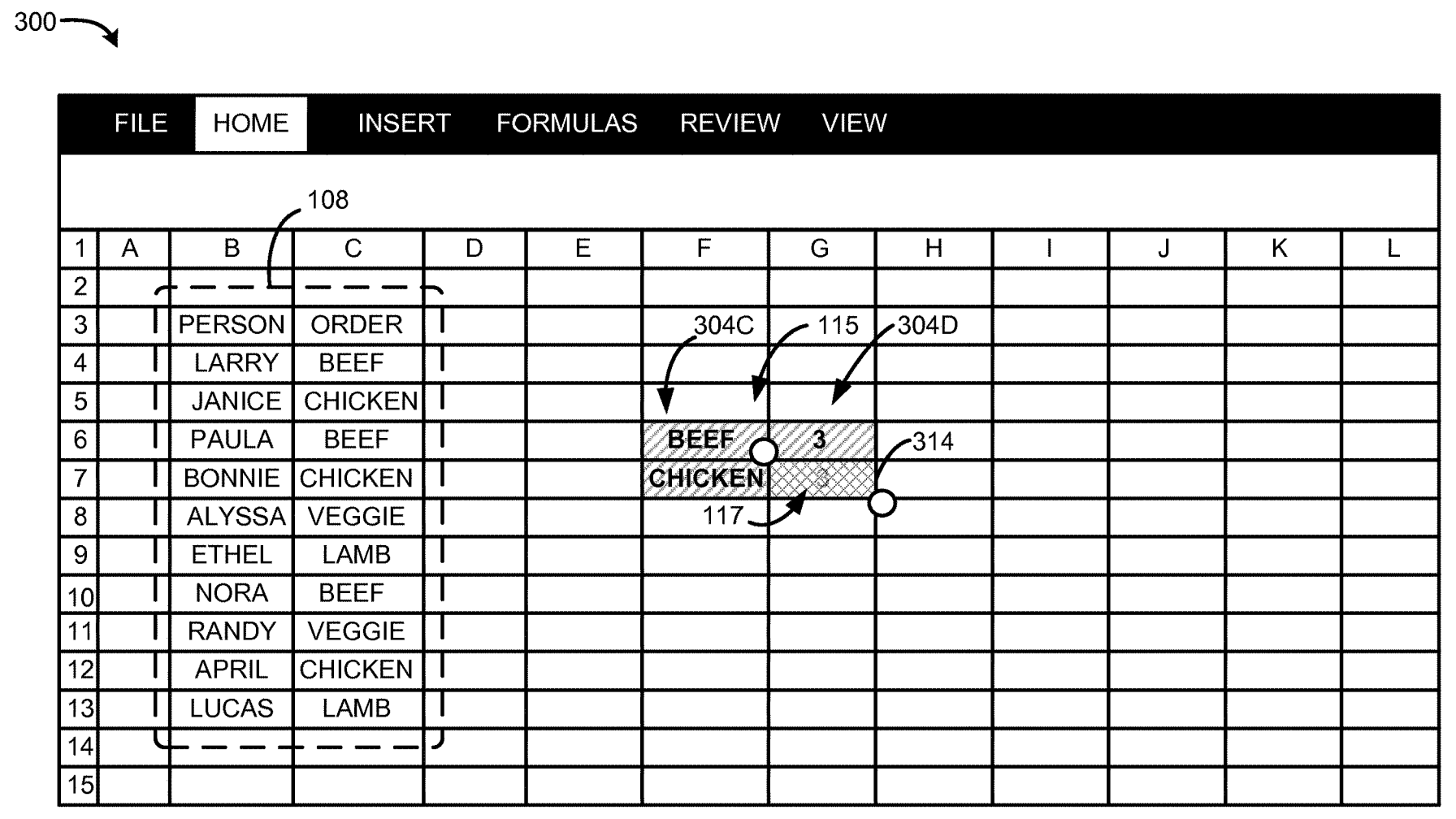

Referring now to FIG. 3B, the screen display 300 indicates that additional data 115, illustrated in FIG. 3B as cells having a hatched pattern, have been entered. The additional data 115 includes the data "BEEF" and "CHICKEN" in column 304C and "3" in column 304D. In some configurations, the application 106 may analyze the data 108 to determine whether the data 108 is conducive to summarization in response to the entry of one or more data of the additional data 115.

If the application 106 determines that a summarization of the data 108 is in progress, the application 106 may execute the aggregator module 116 to identify one or more suggested summaries of the data 108 to augment the additional data 115. The aggregator module 116 may use various technologies and sources for determining the one or more suggested summaries. For example, the aggregator module 116 may analyze the data 108, the additional data 115, outside sources (such as the external data 124), or combinations thereof. It should be noted that the additional data 115 may be received as an input from a user or from other sources. For example, portions of the additional data 115 may be automatically generated upon the input of at least a portion of the data 108.

In FIG. 3B, the application 106 provides a preview of the suggested complete summary 117, a "3," in an autofill section 314. The autofill section 314 is identified in FIG. 3B using a cross-hatched pattern. The suggested complete summary 117 is differentiated in appearance from the additional data 115 to differentiate the additional data 115 from the preview of the suggested complete summary 117.

As the data 108 is updated, changed, or, modified, the suggested complete summary 117 may be updated, changed or, modified. In one example, one or more portions of the suggested complete summary 117 may be a calculation that is updated when the data 108 is changed. The calculation may be in the form of a formula, pivot table, and the like. In that manner, the suggested complete summary 117 may not be a static summary of portions of the data 108, but rather, dynamic data that is updated when the portions of the data 108 are updated.

The preview of the suggested complete summary 117 may be removed for various reasons. For example, the preview of the suggested complete summary 117 may be removed if further data is received in the data 108 or the additional data 115. In another example, the preview of the suggested complete summary 117 may be removed upon the receipt of an instruction from a user to remove the suggested complete summary 117. The preview of the suggested complete summary 117 may also be maintained by the application 106 even though other inputs may be received.

The preview of the suggested complete summary 117 may also be implemented using a feature of the application 106 that may be turned off or on, depending on the preference of the user 112 or the particular configuration of the application 106. As the additional data 115 is augmented with further data, the preview of the suggested complete summary 117 might also be continually updated, illustrated by way of example in FIG. 3C.

Referring to FIG. 3C, the additional data 115 has been augmented by the data, "LAMB." The suggested complete summary 117 in the autofill section 314 has been modified to include the data "2" corresponding to LAMB. As may be deduced from the data 108, the suggested complete summary 117 is a sum of the entries for a particular data. For example, LAMB is entered in the data 108 two times, resulting in a "2" in the suggested summary. The suggested complete summary 117 may include suggestions of entries from the data 108. In the example illustrated in FIG. 3C, the suggested complete summary 117 also includes the data VEGGIE, which corresponds to entries of the data 108. The suggested complete summary 117 may also include a "2," which is a summary associated with VEGGIE in the data 108. Thus, as shown, the suggested complete summary 117 may include summaries of data 108 as well as one or more entries of the data 108.

The suggested complete summary 117 may also help to correct possible errors entered into the additional data 115. For example, the user 112 may enter in a "2" for BEEF. In FIG. 3C, the entry for BEEF in the suggested complete summary 117 has a suggested entry of "2" for LAMB. Thus, in this regard, the additional data 115 may include an error. The suggested complete summary 117 may include a suggestion to correct the error.

As mentioned above, the application 106 might also determine a confidence level for the suggested complete summary 117 in some configurations. The confidence level may represent the probability that the suggested complete summary 117 is correct. Although not limited to any technique, in one example, the confidence level may be adjusted by the receipt of additional data. In FIG. 3B, for example, the application 106 may have determined that the confidence level for the suggested complete summary 117 is low. As noted above, there may be various factors that may be used to determine a confidence level. One factor that may be used is the amount of data in the additional data 115.

With a relatively small amount of data to be analyzed, the application 106 may not be able to calculate a high confidence level. In FIG. 3C, though, the additional data 115 has been augmented with further data. Thus, the confidence level determined in FIG. 3C may be higher. To illustrate or provide an indication of the confidence level, the manner in which the suggested summary is displayed may be modified. In FIG. 3B, the suggested complete summary 117 is a numerical character displayed in a light, gray manner. In FIG. 3C, though, with a higher confidence level, the suggested complete summary 117 are numerical characters displayed in a bold manner.

Although the suggested complete summary 117 may be used in various ways, one manner in which the suggested complete summary 117 may be used is to augment the additional data 115 in the formation of a pivot table. As noted above, a pivot table is a data tool whereby operations on data are represented in a tabular format. In some configurations, a pivot-table can automatically sort, count a total or give an average. The additional data 115 and the suggested complete summary 117 may be modified to form a pivot table.

To do so, the application may be configured to receive an input that the suggested complete summary 117 has been accepted by a user. For example, the application 106 may display pivot table selector 316. The pivot table selector 316 may be configured to receive an input, such as the hand 318 of the user 112. Upon receipt of the input, the application 106 may augment the additional data 115 with the suggested complete summary 117 and form a pivot table, illustrated by way of example in FIG. 3D. In some implementations, the application 106 may also render a total 320. The total 320 may be a sum of various data.

Referring now to FIG. 3D, the screen display 300 indicates that additional data 115 has been augmented by the suggested complete summary 117 to form a pivot table 322. As illustrated, the appearance of the data associated with the suggested complete summary 117 may be modified to have an appearance that is the same as or similar to the additional data 115 in response to receiving the user 112 selection of the preview of the suggested complete summary 117. In one implementation, the preview of the suggested complete summary 117 may be modified to have the same font, text size, shape, shading or other visual attribute as the additional data 115. In another implementation, the preview of the suggested complete summary 117 may be modified to have the same font, text size, shape, shading or other visual attribute as the data 108. Once generated, the user 112 may be able to perform various operations on the data in the pivot table 322.

Figure 3E:
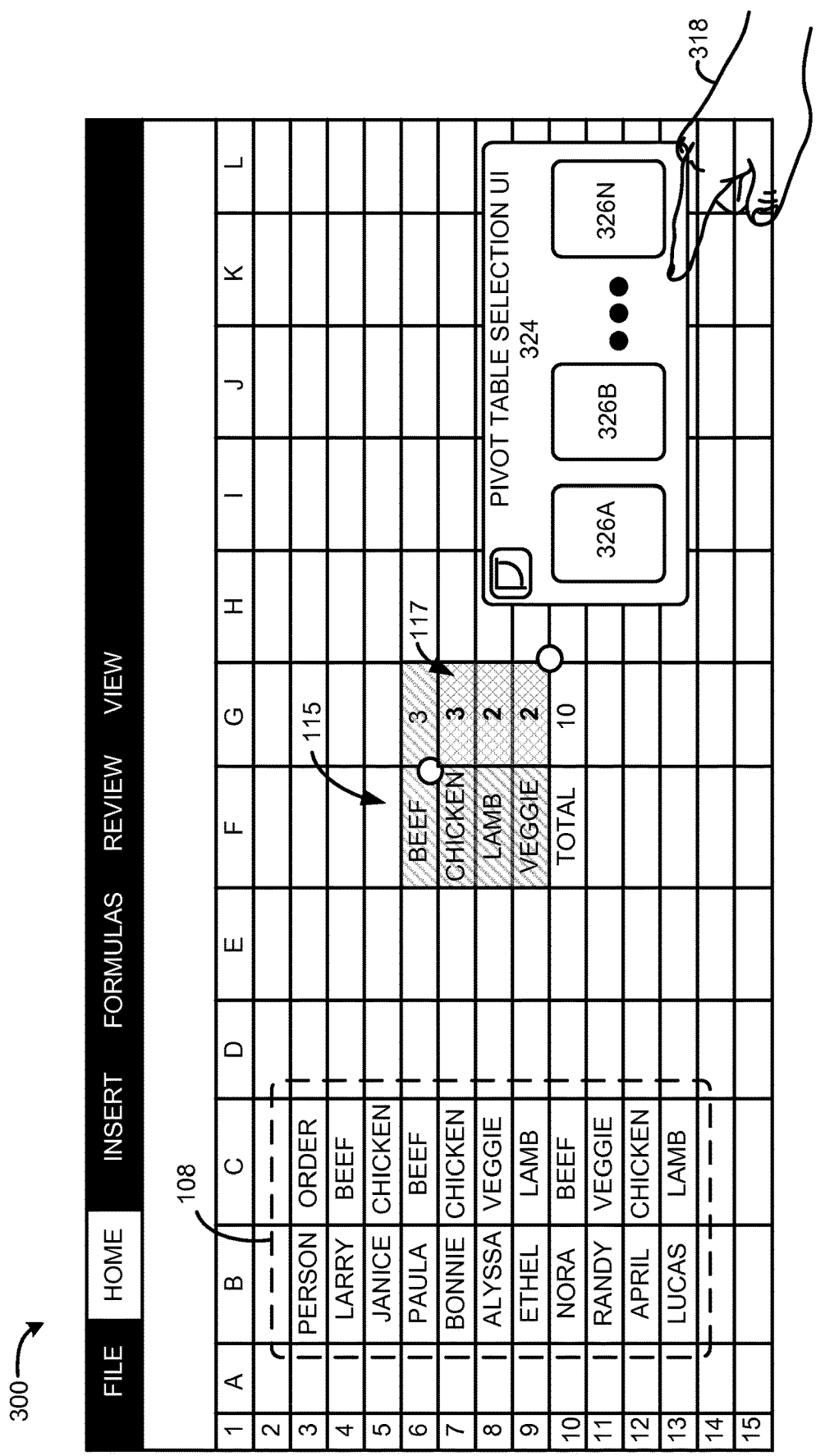

The screen display 300 of FIG. 3E illustrates an additional pivot table selection feature that may be used in some implementations. In FIG. 3E, the application 106 has received the data 108 and the additional data 115. The application 106 has also generated the suggested complete summary 117. In FIG. 3E, though, the application 106 has executed the UI generator 126, as described in FIG. 1. The UI generator 126 may be configured to generate one or more UIs relating to one or more suggested complete summaries 117.

In FIG. 3E, the UI generator 126 has generated a pivot table selection UI 324. The pivot table selection UI 324 may have displayed therein selectable pivot table selections 326A-326N. The pivot table selections 326A-326N may display therein various formats of data or alternate pivot table configurations than the pivot table configuration that may be previewed, such as the preview of the suggested complete summary 117. For example, the pivot table selections 326A-326N may have various types of pivot tables, graphs, and the like, the form of which the pivot table 322 may take when generated. In one configuration, the pivot table selection 326A may show a pivot table in column/row format (similar to the pivot table 322 of FIG. 3D), the pivot table selection 326B may show a pivot table in a column/row format, but with the data in a different orientation than the pivot table selection 326A.

In another example, the pivot table selections 326A-326N may be alternate suggested complete summaries 117 selectable by the user 112. In this example, the application 106 may generate one or more alternate suggested complete summaries 117. The application 106 may display the suggested complete summary 117 having the highest confidence level with the additional data 115, while displaying one or more alternate suggested complete summaries 117 having comparatively lower confidence levels in the pivot table selection UI 324 as pivot table selections 326A-326N.

In some configurations, the pivot table selection 326A may be the suggested complete summary 117. The user 112 may select the particular one of the pivot table selections 326A-326N based on need or preference. Upon the selection of the particular one of the pivot table selections 326A-326N, the remaining pivot table selections 326A-326N may be eliminated (e.g. the display is removed). One or more of the alternate suggested complete summaries 117 may be eliminated in response to receiving further data associated with the data 108 or the additional data 115. One or more of the alternate suggested complete summaries 117 may also be eliminated in response to receiving a selection of one of the alternate suggested complete summaries 117.

Various aspect of the presently disclosed subject matter may be considered in view of the following clauses:

Clause 1. A computer-implemented method for summary data autofill, the method comprising:
receiving user input of additional data into a document having data contained therein;
determining, based at least in part on the data and the additional data, that the additional data is at least a partial summary of the data; and
in response to determining that the additional data is a partial summary of the data, presenting a preview of a suggested complete summary of the data.

Clause 2. The computer-implemented method of any of clause 1 and clauses 3-20, further comprising determining a confidence level representing a probability that the suggested complete summary is correct.

Clause 3. The computer-implemented method of any of clauses 1-2 and clauses 4-20, further comprising modifying the preview based upon the confidence level associated with the suggested complete summary of the data.

Clause 4. The computer-implemented method of any of clauses 1-3 and clauses 5-20, wherein the at least the partial summary of the data comprises an error and the preview of the suggested complete summary of the data comprises a suggestion to correct the error.

Clause 5. The computer-implemented method of any of clauses 1-4 and clauses 6-20, further comprising updating the preview of the suggested complete summary in response to the updating of the confidence level.

Clause 6. The computer-implemented method of any of clauses 1-5 and clauses 7-20, further comprising replacing the additional data with the suggested complete summary and applying one or more visual attributes associated with the additional data to the suggested complete summary.

Clause 7. The computer-implemented method of any of clauses 1-6 and clauses 8-20, wherein determining that the additional data is a partial summary of the data is performed in response to receiving the additional data into the document.

Clause 8. A computer-readable storage medium having computer readable instructions stored thereupon that, when executed by a computer, cause the computer to:
analyze input of additional data in a document having data contained therein,
determine, based at least in part on the input, if the additional data is at least a partial summary of the data, and
in response to a determination that the additional data is at least a partial summary of the data, presenting a preview of a suggested complete summary of the data.

Clause 9. The computer-readable storage medium of any of clause 8 and clauses 10-20, wherein determine, based on the input, if the additional data is a summary of the data comprises analyzing the data to determine if a portion of the additional data is a sum of at least a portion of the data.

Clause 10. The computer-readable storage medium of any of clauses 8-9 and clauses 11-20, wherein provide a preview of suggested complete summary of the data comprises determine a plurality of alternate suggested complete summaries of the data.

Clause 11. The computer-readable storage medium of any of clauses 8-10 and clauses 12-20, further comprising instructions that cause the computer to eliminate at least one of the plurality of alternate suggested complete summaries in response to receiving further data associated with the additional data or a user selection of one of the plurality of alternate suggested complete summaries.

Clause 12. The computer-readable storage medium of any of clauses 8-11 and clauses 13-20, further comprising instructions that cause the computer to display for selection the plurality of alternate suggested complete summaries.

Clause 13. The computer-readable storage medium of any of clauses 8-12 and clauses 14-20, wherein the preview comprises a pivot table.

Clause 14. The computer-readable storage medium of any of clauses 8-13 and clauses 15-20, further comprising instructions that cause the computer to generate a pivot table from the preview upon the receipt of a selection of the preview.

Clause 15. The computer-readable storage medium of any of clauses 8-14 and clauses 16-20, further comprising instructions that cause the computer to generate a confidence level for the suggested complete summary.

Clause 16. The computer-readable storage medium of any of clauses 8-15 and clauses 17-20, further comprising instructions that cause the computer to update the confidence level in response to receiving further data associated with the additional data or the data.

Clause 17. The computer-readable storage medium of any of clauses 8-16 and clauses 18-20, further comprising instructions that cause the computer to update the preview in response to an update of the confidence level.

Clause 18. A system comprising:
a processor; and
a computer-readable storage medium in communication with the processor, the computer-readable storage medium having computer-executable instructions stored thereupon which, when executed by the processor, cause the processor to
  receive user input comprising additional data into a document having data contained therein,
  determine, based at least in part on the data, if the additional data is a partial summary of the data,
  in response to determining that the additional data is a partial summary of the data, present a preview of a suggested complete summary of the data, wherein the preview is in the form of a pivot table, and
  in response to receiving a selection of the preview of the suggested complete summary, insert the pivot table into the document.

Clause 19. The system of any of clauses 17-18 and clause 20, wherein in response to determining that the additional data is a partial summary of the data, the computer-executable instructions further include instructions to present alternate suggested complete summaries, wherein the preview of a suggested complete summary of the data is a suggested complete summary with a highest confidence level.

Clause 20. The system of any of clauses 18-19, wherein in response to determining that the additional data is a partial summary of the data, the computer-executable instructions further include instructions to present alternate pivot table configurations.

Figure 4:
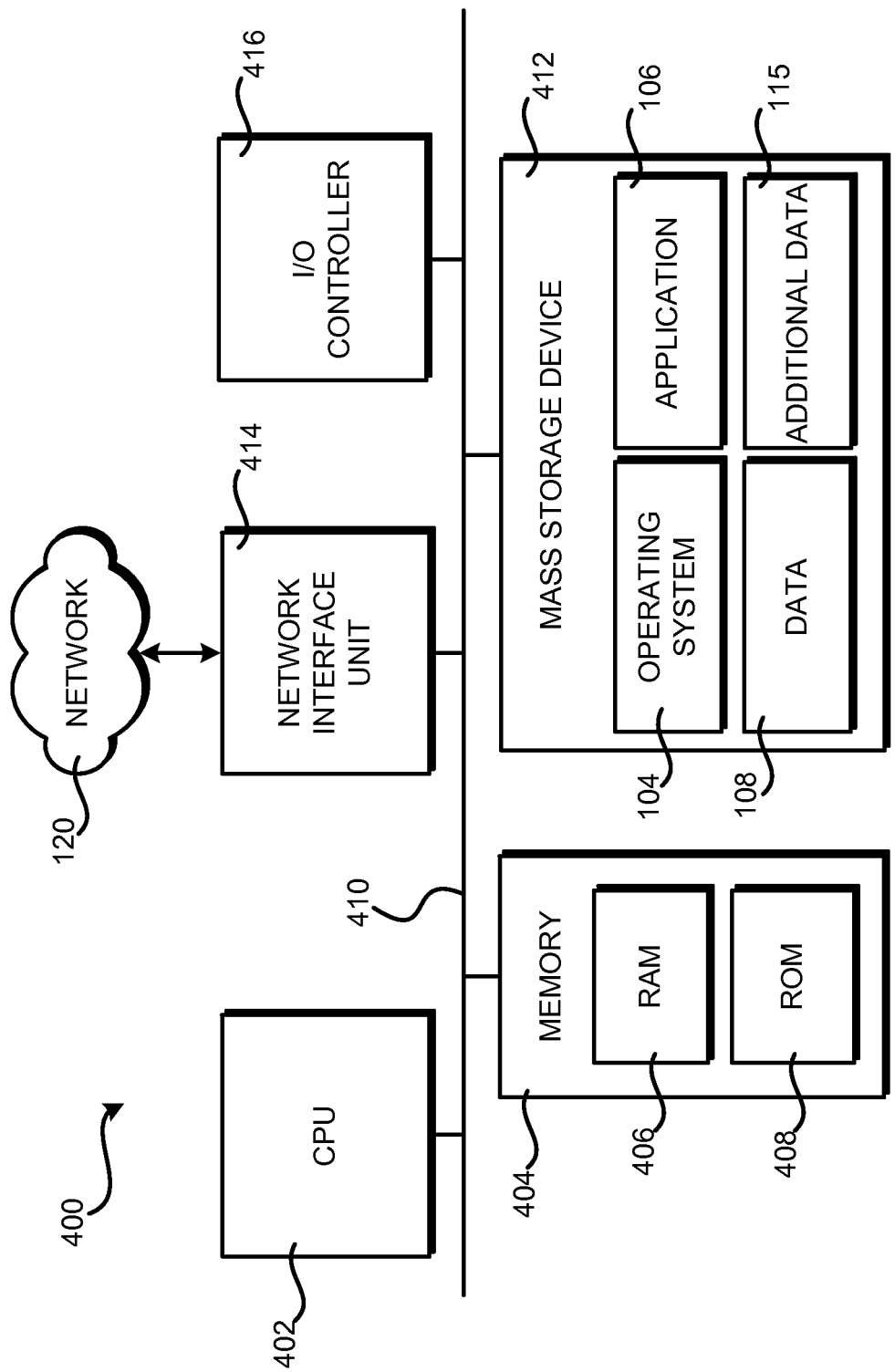
FIG. 4 is a computer architecture diagram illustrating an illustrative computer hardware and software architecture for a computing system capable of implementing aspects presented herein.

FIG. 4 illustrates an illustrative computer architecture 400 for a device capable of executing the software components described herein for summary data autofill. Thus, the computer architecture 400 illustrated in FIG. 4 illustrates an architecture for a server computer, mobile phone, a smart phone, a desktop computer, a netbook computer, a tablet computer, and/or a laptop computer. The computer architecture 400 may be utilized to execute any aspects of the software components presented herein.

The computer architecture 400 illustrated in FIG. 4 includes a central processing unit 402 ("CPU"), a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing the operating system 104 and one or more application programs including, but not limited to, the application 106. The mass storage device 412 also can be configured to store data such as, for example, the data 108.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes the claims, a "computer storage medium" or "computer-readable storage medium," and variations thereof, do not include waves, signals, and/or other transitory and/or intangible communication media, per se. For the purposes of the claims, "computer-readable storage medium," and variations thereof, refers to one or more types of articles of manufacture.

According to various configurations, the computer architecture 400 may operate in a networked environment using logical connections to remote computers through a network such as the network 120. The computer architecture 400 may connect to the network 120 through a network interface unit 414 connected to the bus 410. It should be appreciated that the network interface unit 414 also may be utilized to connect to other types of networks and remote computer systems such as, for example, the server computer 118. The computer architecture 400 also may include an input/output controller 416 for receiving and processing input from a number of other devices, including a keyboard, mouse, or electronic stylus (not shown in FIG. 4). Similarly, the input/output controller 416 may provide output to a display screen, a printer, or other type of output device (also not shown in FIG. 4).

It should be appreciated that the software components described herein may, when loaded into the CPU 402 and executed, transform the CPU 402 and the overall computer architecture 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 400 in order to store and execute the software components presented herein. It also should be appreciated that the computer architecture 400 may include other types of computing devices, including hand-held computers, embedded computer systems, personal digital assistants, and other types of computing devices known to those skilled in the art. It is also contemplated that the computer architecture 400 may not include all of the components shown in FIG. 4, may include other components that are not explicitly shown in FIG. 4, or may utilize an architecture completely different than that shown in FIG. 4.

Figure 5:
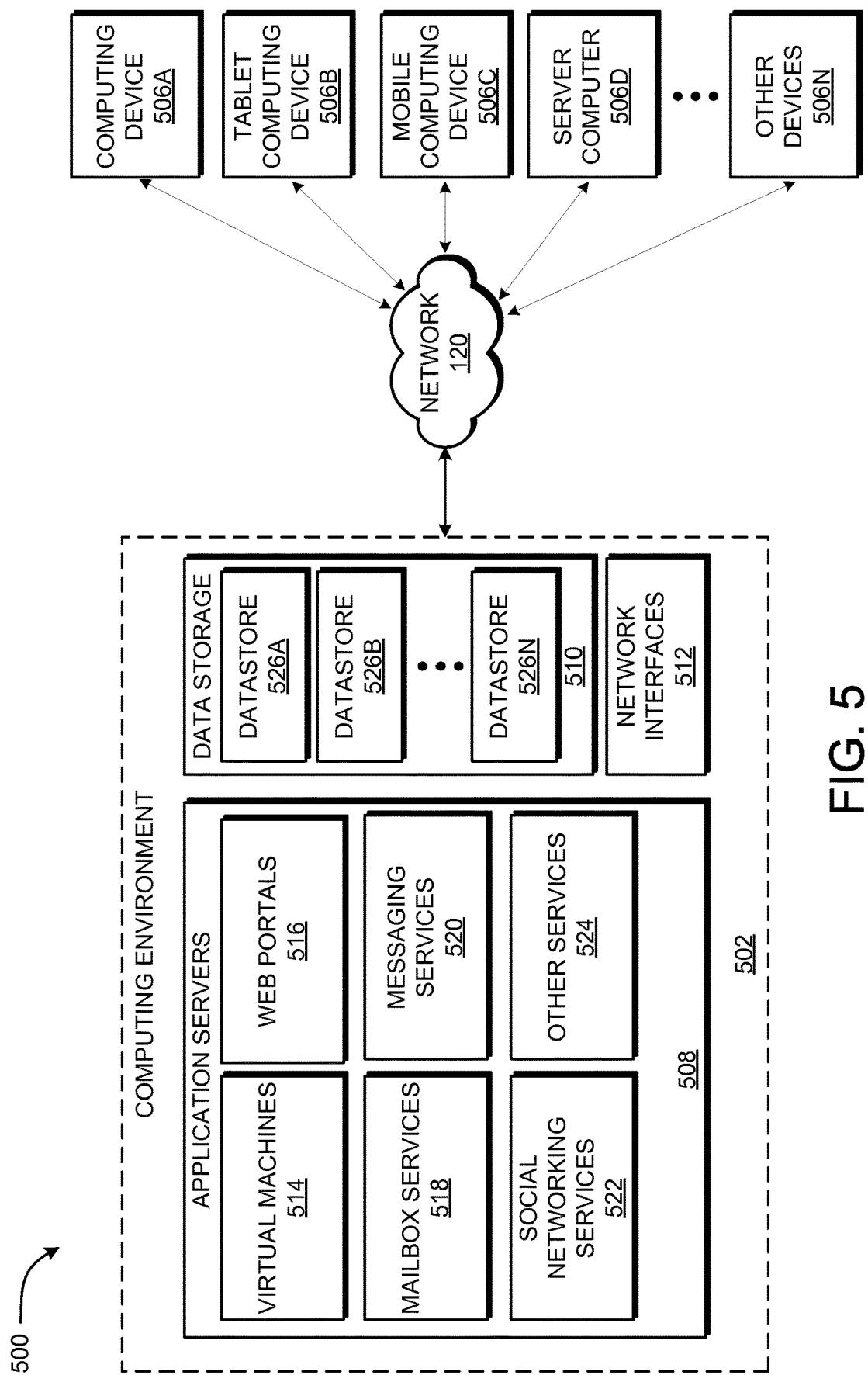
FIG. 5 is a diagram illustrating a distributed computing environment capable of implementing aspects presented herein.

FIG. 5 illustrates an illustrative distributed computing environment 500 capable of executing the software components described herein for summary data autofill. Thus, the distributed computing environment 500 illustrated in FIG. 5 can be used to provide the functionality described herein with respect to the user device 102 and/or the server computer 118. The distributed computing environment 500 thus may be utilized to execute any aspects of the software components presented herein.

According to various implementations, the distributed computing environment 500 includes a computing environment 502 operating on, in communication with, or as part of the network 504. The network 504 also can include various access networks. According to various implementations, the functionality of the network 504 is provided by the network 120 illustrated in FIG. 1. One or more client devices 506A-506N (hereinafter referred to collectively and/or generically as "clients 506") can communicate with the computing environment 502 via the network 504 and/or other connections (not illustrated in FIG. 5). In the illustrated configuration, the clients 506 include a computing device 506A such as a laptop computer, a desktop computer, or other computing device; a slate or tablet computing device ("tablet computing device") 506B; a mobile computing device 506C such as a mobile telephone, a smart phone, or other mobile computing device; a server computer 506D; and/or other devices 506N. It should be understood that any number of clients 506 can communicate with the computing environment 502. Two example computing architectures for the clients 506 are illustrated and described herein with reference to FIGS. 4 and 6. It should be understood that the illustrated clients 506 and computing architectures illustrated and described herein are illustrative, and should not be construed as being limited in any way.

In the illustrated configuration, the computing environment 502 includes application servers 508, data storage 510, and one or more network interfaces 512. According to various implementations, the functionality of the application servers 508 can be provided by one or more server computers that are executing as part of, or in communication with, the network 504. The application servers 508 can host various services, virtual machines, portals, and/or other resources. In the illustrated configuration, the application servers 508 host one or more virtual machines 514 for hosting applications or other functionality. According to various implementations, the virtual machines 514 host one or more applications and/or software modules for providing the functionality described herein for summary data autofill. It should be understood that this configuration is illustrative, and should not be construed as being limiting in any way. The application servers 508 also host or provide access to one or more Web portals, link pages, Web sites, and/or other information ("Web portals") 516.

According to various implementations, the application servers 508 also include one or more mailbox services 518 and one or more messaging services 520. The mailbox services 518 can include electronic mail ("email") services. The mailbox services 518 also can include various personal information management ("PIM") services including, but not limited to, calendar services, contact management services, collaboration services, and/or other services. The messaging services 520 can include, but are not limited to, instant messaging services, chat services, forum services, and/or other communication services.

The application servers 508 also can include one or more social networking services 522. The social networking services 522 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 522 are provided by or include the FACEBOOK social networking service, the LINKEDIN professional networking service, the MYSPACE social networking service, the FOURSQUARE geographic networking service, the YAMMER office colleague networking service, and the like.

In other configurations, the social networking services 522 are provided by other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 522 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 522 are not mentioned herein for the sake of brevity. As such, the above configurations are illustrative, and should not be construed as being limited in any way.

As shown in FIG. 5, the application servers 508 also can host other services, applications, portals, and/or other resources ("other resources") 524. The other resources 524 can include, but are not limited to, the server application 122. It therefore can be appreciated that the computing environment 502 can provide integration of the technologies disclosed herein provided herein for summary data autofill with various mailbox, messaging, social networking, and/or other services or resources.

As mentioned above, the computing environment 502 can include the data storage 510. According to various implementations, the functionality of the data storage 510 is provided by one or more databases operating on, or in communication with, the network 504. The functionality of the data storage 510 also can be provided by one or more server computers configured to host data for the computing environment 502. The data storage 510 can include, host, or provide one or more real or virtual datastores 526A-526N (hereinafter referred to collectively and/or generically as "datastores 526"). The datastores 526 are configured to host data used or created by the application servers 508 and/or other data. Although not illustrated in FIG. 5, the datastores 526 also can host or store the data 108 or the additional data 115, if desired.

The computing environment 502 can communicate with, or be accessed by, the network interfaces 512. The network interfaces 512 can include various types of network hardware and software for supporting communications between two or more computing devices including, but not limited to, the clients 506 and the application servers 508. It should be appreciated that the network interfaces 512 also may be utilized to connect to other types of networks and/or computer systems.

It should be understood that the distributed computing environment 500 described herein can provide any aspects of the software elements described herein with any number of virtual computing resources and/or other distributed computing functionality that can be configured to execute any aspects of the software components disclosed herein. According to various implementations of the technologies disclosed herein, the distributed computing environment 500 provides the software functionality described herein as a service to the clients 506. It should be understood that the clients 506 can include real or virtual machines including, but not limited to, server computers, web servers, personal computers, mobile computing devices, smart phones, and/or other devices. As such, various configurations of the technologies disclosed herein enable any device configured to access the distributed computing environment 500 to utilize the functionality described herein for summary data autofill.

Figure 6:
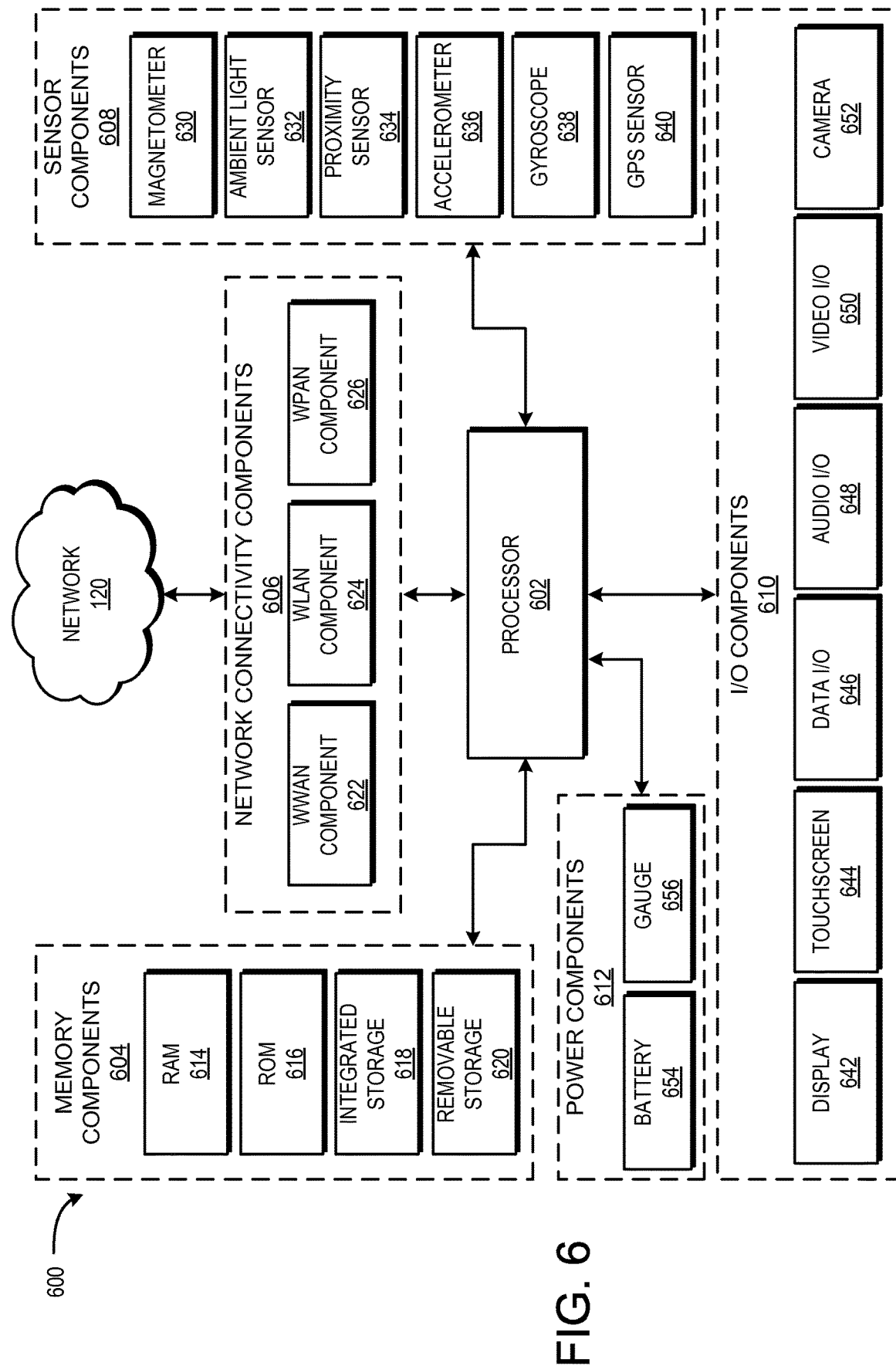
FIG. 6 is a computer architecture diagram illustrating a computing device architecture capable of implementing aspects presented herein.

Turning now to FIG. 6, an illustrative computing device architecture 600 for a computing device that is capable of executing various software components described herein for summary data autofill. The computing device architecture 600 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. Moreover, the computing device architecture 600 is applicable to any of the clients 606 shown in FIG. 5. Furthermore, aspects of the computing device architecture 600 may be applicable to traditional desktop computers, portable computers (e.g., laptops, notebooks, ultra-portables, and netbooks), server computers, and other computer systems, such as described herein with reference to FIG. 4. For example, the single touch and multi-touch aspects disclosed herein below may be applied to desktop computers that utilize a touchscreen or some other touch-enabled device, such as a touch-enabled track pad or touch-enabled mouse.

The computing device architecture 600 illustrated in FIG. 6 includes a processor 602, memory components 604, network connectivity components 606, sensor components 608, input/output components 610, and power components 612. In the illustrated configuration, the processor 602 is in communication with the memory components 604, the network connectivity components 606, the sensor components 608, the input/output ("I/O") components 610, and the power components 612. Although no connections are shown between the individuals components illustrated in FIG. 6, the components can interact to carry out device functions. In some configurations, the components are arranged so as to communicate via one or more busses (not shown).

The processor 602 includes a central processing unit ("CPU") configured to process data, execute computer-executable instructions of one or more application programs, and communicate with other components of the computing device architecture 600 in order to perform various functionality described herein. The processor 602 may be utilized to execute aspects of the software components presented herein and, particularly, those that utilize, at least in part, a touch-enabled input.

In some configurations, the processor 602 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, and greater), video games, three-dimensional ("3D") modeling applications, and the like. In some configurations, the processor 602 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 602 is, or is included in, a system-on-chip ("SoC") along with one or more of the other components described herein below. For example, the SoC may include the processor 602, a GPU, one or more of the network connectivity components 606, and one or more of the sensor components 608. In some configurations, the processor 602 is fabricated, in part, utilizing a package-on-package ("PoP") integrated circuit packaging technique. Moreover, the processor 602 may be a single core or multi-core processor.

The processor 602 may be created in accordance with an ARM architecture, available for license from ARM HOLDINGS of Cambridge, United Kingdom. Alternatively, the processor 602 may be created in accordance with an x86 architecture, such as is available from INTEL CORPORATION of Mountain View, Calif. and others. In some configurations, the processor 602 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 604 include a random access memory ("RAM") 614, a read-only memory ("ROM") 616, an integrated storage memory ("integrated storage") 618, and a removable storage memory ("removable storage") 620. In some configurations, the RAM 614 or a portion thereof, the ROM 616 or a portion thereof, and/or some combination the RAM 614 and the ROM 616 is integrated in the processor 602. In some configurations, the ROM 616 is configured to store a firmware, an operating system or a portion thereof (e.g., operating system kernel), and/or a bootloader to load an operating system kernel from the integrated storage 618 or the removable storage 620.

The integrated storage 618 can include a solid-state memory, a hard disk, or a combination of solid-state memory and a hard disk. The integrated storage 618 may be soldered or otherwise connected to a logic board upon which the processor 602 and other components described herein also may be connected. As such, the integrated storage 618 is integrated in the computing device. The integrated storage 618 is configured to store an operating system or portions thereof, application programs, data, and other software components described herein.

The removable storage 620 can include a solid-state memory, a hard disk, or a combination of solid-state memory and a hard disk. In some configurations, the removable storage 620 is provided in lieu of the integrated storage 618. In other configurations, the removable storage 620 is provided as additional optional storage. In some configurations, the removable storage 620 is logically combined with the integrated storage 618 such that the total available storage is made available and shown to a user as a total combined capacity of the integrated storage 618 and the removable storage 620.

The removable storage 620 is configured to be inserted into a removable storage memory slot (not shown) or other mechanism by which the removable storage 620 is inserted and secured to facilitate a connection over which the removable storage 620 can communicate with other components of the computing device, such as the processor 602. The removable storage 620 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 604 can store an operating system. According to various configurations, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 606 include a wireless wide area network component ("WWAN component") 622, a wireless local area network component ("WLAN component") 624, and a wireless personal area network component ("WPAN component") 626. The network connectivity components 606 facilitate communications to and from a network 120, which may be a WWAN, a WLAN, or a WPAN. Although a single network 120 is illustrated, the network connectivity components 606 may facilitate simultaneous communication with multiple networks. For example, the network connectivity components 606 may facilitate simultaneous communications with multiple networks via one or more of a WWAN, a WLAN, or a WPAN.

The network 120 may be a WWAN, such as a mobile telecommunications network utilizing one or more mobile telecommunications technologies to provide voice and/or data services to a computing device utilizing the computing device architecture 600 via the WWAN component 622. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 120 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 120 may be configured to provide voice and/or data communications with any combination of the above technologies. The network 120 may be configured to or adapted to provide voice and/or data communications in accordance with future generation technologies.

In some configurations, the WWAN component 622 is configured to provide dual-multi-mode connectivity to the network 120. For example, the WWAN component 622 may be configured to provide connectivity to the network 120, wherein the network 120 provides service via GSM and UMTS technologies, or via some other combination of technologies. Alternatively, multiple WWAN components 622 may be utilized to perform such functionality, and/or provide additional functionality to support other non-compatible technologies (i.e., incapable of being supported by a single WWAN component). The WWAN component 622 may facilitate similar connectivity to multiple networks (e.g., a UMTS network and an LTE network).

The network 120 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 624 is configured to connect to the network 120 via the WI-FI access points. Such connections may be secured via various encryption technologies including, but not limited, WI-FI Protected Access ("WPA"), WPA2, Wired Equivalent Privacy ("WEP"), and the like.

The network 120 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 626 is configured to facilitate communications with other devices, such as peripherals, computers, or other computing devices via the WPAN.

The sensor components 608 include a magnetometer 630, an ambient light sensor 632, a proximity sensor 634, an accelerometer 636, a gyroscope 638, and a Global Positioning System sensor ("GPS sensor") 640. It is contemplated that other sensors, such as, but not limited to, temperature sensors or shock detection sensors, also may be incorporated in the computing device architecture 600.

The magnetometer 630 is configured to measure the strength and direction of a magnetic field. In some configurations the magnetometer 630 provides measurements to a compass application program stored within one of the memory components 604 in order to provide a user with accurate directions in a frame of reference including the cardinal directions, north, south, east, and west. Similar measurements may be provided to a navigation application program that includes a compass component. Other uses of measurements obtained by the magnetometer 630 are contemplated.

The ambient light sensor 632 is configured to measure ambient light. In some configurations, the ambient light sensor 632 provides measurements to an application program stored within one the memory components 604 in order to automatically adjust the brightness of a display (described below) to compensate for low-light and high-light environments. Other uses of measurements obtained by the ambient light sensor 632 are contemplated.

The proximity sensor 634 is configured to detect the presence of an object or thing in proximity to the computing device without direct contact. In some configurations, the proximity sensor 634 detects the presence of a user's body (e.g., the user's face) and provides this information to an application program stored within one of the memory components 604 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 634 are contemplated.

The accelerometer 636 is configured to measure proper acceleration. In some configurations, output from the accelerometer 636 is used by an application program as an input mechanism to control some functionality of the application program. For example, the application program may be a video game in which a character, a portion thereof, or an object is moved or otherwise manipulated in response to input received via the accelerometer 636. In some configurations, output from the accelerometer 636 is provided to an application program for use in switching between landscape and portrait modes, calculating coordinate acceleration, or detecting a fall. Other uses of the accelerometer 636 are contemplated.

The gyroscope 638 is configured to measure and maintain orientation. In some configurations, output from the gyroscope 638 is used by an application program as an input mechanism to control some functionality of the application program. For example, the gyroscope 638 can be used for accurate recognition of movement within a 3D environment of a video game application or some other application. In some configurations, an application program utilizes output from the gyroscope 638 and the accelerometer 636 to enhance control of some functionality of the application program. Other uses of the gyroscope 638 are contemplated.

The GPS sensor 640 is configured to receive signals from GPS satellites for use in calculating a location. The location calculated by the GPS sensor 640 may be used by any application program that requires or benefits from location information. For example, the location calculated by the GPS sensor 640 may be used with a navigation application program to provide directions from the location to a destination or directions from the destination to the location. Moreover, the GPS sensor 640 may be used to provide location information to an external location-based service, such as E911 service. The GPS sensor 640 may obtain location information generated via WI-FI, WIMAX, and/or cellular triangulation techniques utilizing one or more of the network connectivity components 606 to aid the GPS sensor 640 in obtaining a location fix. The GPS sensor 640 may also be used in Assisted GPS ("A-GPS") systems.

The I/O components 610 include a display 642, a touchscreen 644, a data I/O interface component ("data I/O") 646, an audio I/O interface component ("audio I/O") 648, a video I/O interface component ("video I/O") 650, and a camera 652. In some configurations, the display 642 and the touchscreen 644 are combined. In some configurations two or more of the data I/O component 646, the audio I/O component 648, and the video I/O component 650 are combined. The I/O components 610 may include discrete processors configured to support the various interface described below, or may include processing functionality built-in to the processor 602.

The display 642 is an output device configured to present information in a visual form. In particular, the display 642 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 642 is a liquid crystal display ("LCD") utilizing any active or passive matrix technology and any backlighting technology (if used). In some configurations, the display 642 is an organic light emitting diode ("OLED") display. Other display types are contemplated.

The touchscreen 644 is an input device configured to detect the presence and location of a touch. The touchscreen 644 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 644 is incorporated on top of the display 642 as a transparent layer to enable a user to use one or more touches to interact with objects or other information presented on the display 642. In other configurations, the touchscreen 644 is a touch pad incorporated on a surface of the computing device that does not include the display 642. For example, the computing device may have a touchscreen incorporated on top of the display 642 and a touch pad on a surface opposite the display 642.

In some configurations, the touchscreen 644 is a single-touch touchscreen. In other configurations, the touchscreen 644 is a multi-touch touchscreen. In some configurations, the touchscreen 644 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 644. As such, a developer may create gestures that are specific to a particular application program.

In some configurations, the touchscreen 644 supports a tap gesture in which a user taps the touchscreen 644 once on an item presented on the display 642. The tap gesture may be used for various reasons including, but not limited to, opening or launching whatever the user taps. In some configurations, the touchscreen 644 supports a double tap gesture in which a user taps the touchscreen 644 twice on an item presented on the display 642. The double tap gesture may be used for various reasons including, but not limited to, zooming in or zooming out in stages. In some configurations, the touchscreen 644 supports a tap and hold gesture in which a user taps the touchscreen 644 and maintains contact for at least a pre-defined time. The tap and hold gesture may be used for various reasons including, but not limited to, opening a context-specific menu.

In some configurations, the touchscreen 644 supports a pan gesture in which a user places a finger on the touchscreen 644 and maintains contact with the touchscreen 644 while moving the finger on the touchscreen 644. The pan gesture is also referred to above with reference to FIGS. 1-3E as a tap-drag gesture. The pan gesture may be used for various reasons including, but not limited to, moving through screens, images, or menus at a controlled rate and/or indicating a command to pan or move the displayed data 108 in the UIs 114. Multiple finger pan gestures are also contemplated. In some configurations, the touchscreen 644 supports a flick gesture in which a user swipes a finger in the direction the user wants the screen to move. The flick gesture may be used for various reasons including, but not limited to, scrolling horizontally or vertically through menus or pages. In some configurations, the touchscreen 644 supports a pinch and stretch gesture in which a user makes a pinching motion with two fingers (e.g., thumb and forefinger) on the touchscreen 644 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 644. As such, the above gestures should be understood as being illustrative and should not be construed as being limiting in any way.

The data I/O interface component 646 is configured to facilitate input of data to the computing device and output of data from the computing device. In some configurations, the data I/O interface component 646 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 648 is configured to provide audio input and/or output capabilities to the computing device. In some configurations, the audio I/O interface component 646 includes a microphone configured to collect audio signals. In some configurations, the audio I/O interface component 646 includes a headphone jack configured to provide connectivity for headphones or other external speakers. In some configurations, the audio interface component 648 includes a speaker for the output of audio signals. In some configurations, the audio I/O interface component 646 includes an optical audio cable out.

The video I/O interface component 650 is configured to provide video input and/or output capabilities to the computing device. In some configurations, the video I/O interface component 650 includes a video connector configured to receive video as input from another device (e.g., a video media player such as a DVD or BLURAY player) or send video as output to another device (e.g., a monitor, a television, or some other external display). In some configurations, the video I/O interface component 650 includes a High-Definition Multimedia Interface ("HDMI"), mini-HDMI, micro-HDMI, DisplayPort, or proprietary connector to input/output video content. In some configurations, the video I/O interface component 650 or portions thereof is combined with the audio I/O interface component 648 or portions thereof.

The camera 652 can be configured to capture still images and/or video. The camera 652 may utilize a charge coupled device ("CCD") or a complementary metal oxide semiconductor ("CMOS") image sensor to capture images. In some configurations, the camera 652 includes a flash to aid in taking pictures in low-light environments. Settings for the camera 652 may be implemented as hardware or software buttons.

Although not illustrated, one or more hardware buttons may also be included in the computing device architecture 600. The hardware buttons may be used for controlling some operational aspect of the computing device. The hardware buttons may be dedicated buttons or multi-use buttons. The hardware buttons may be mechanical or sensor-based.

The illustrated power components 612 include one or more batteries 654, which can be connected to a battery gauge 656. The batteries 654 may be rechargeable or disposable. Rechargeable battery types include, but are not limited to, lithium polymer, lithium ion, nickel cadmium, and nickel metal hydride. Each of the batteries 654 may be made of one or more cells.

The battery gauge 656 can be configured to measure battery parameters such as current, voltage, and temperature. In some configurations, the battery gauge 656 is configured to measure the effect of a battery's discharge rate, temperature, age and other factors to predict remaining life within a certain percentage of error. In some configurations, the battery gauge 656 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 612 may also include a power connector, which may be combined with one or more of the aforementioned I/O components 610. The power components 612 may interface with an external power system or charging equipment via a power I/O component.

Based on the foregoing, it should be appreciated that technologies for summary data autofill have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

What is claimed is:

1. A computer-implemented method for summary data autofill, the method comprising:
   receiving input of additional data at a location on a document that comprises preexisting data contained therein;
   in response to receiving the input of the additional data on the document, determining, based on an analysis of the additional data on the document against the preexisting data on the document, that the additional data is a partial summary of the preexisting data on the document;
   in response to determining that the additional data on the document is the partial summary of the preexisting data on the document, automatically generating a suggested complete summary of the preexisting data that completes the partial summary that includes the additional data on the document;
   presenting a preview of the suggested complete summary of the preexisting data on the document, the presenting of the preview of the suggested complete summary comprises augmenting the additional data at the location on the document with suggested summary data to complete the partial summary that includes the addition data on the document, the suggested summary data being visually distinguished from the additional data on the document;
   receiving an indication of acceptance of the suggested complete summary; and
   in response to receiving the indication of the acceptance of the suggested complete summary, modifying the suggested summary data to be visually indistinguishable from the additional data on the document.

2. The computer-implemented method of claim 1, further comprising determining a confidence level representing a probability that the suggested complete summary is correct.

3. The computer-implemented method of claim 2, further comprising modifying the preview based upon the confidence level associated with the suggested complete summary of the preexisting data.

4. The computer-implemented method of claim 2, wherein the confidence level is based on an amount of additional data received, the method further comprising increasing the confidence level in response to receiving further additional data.

5. The computer-implemented method of claim 1, wherein the additional data received comprises an error and the preview of the suggested complete summary of the preexisting data comprises a suggestion to correct the error.

6. The computer-implemented method of claim 1, further comprising applying one or more visual attributes to the suggested summary data that visually distinguishes the suggested summary data from the additional data.

7. A computer-readable storage medium having computer readable instructions stored thereupon that, when executed by a computer, cause the computer to perform operations comprising:
   receiving input of additional data at a location on a document that comprises preexisting data contained therein;
   in response to receiving the input of the additional data on the document, determining, based on an analysis of the additional data on the document against the preexisting data on the document, that the additional data is a partial summary of the preexisting data on the document;
   in response to the determining that the additional data on the document is the partial summary of the preexisting data on the document, automatically generating a suggested complete summary of the preexisting data that completes the partial summary that includes the additional data on the document;
   presenting a preview of the suggested complete summary of the preexisting data on the document, the presenting of the preview of the suggested complete summary comprises augmenting the additional data at the location on the document with suggested summary data to complete the partial summary that includes the addition data on the document, the suggested summary data being visually distinguished from the additional data on the document;
   receiving an indication of acceptance of the suggested complete summary; and
   in response to receiving the indication of the acceptance of the suggested complete summary, modifying the suggested summary data to be visually indistinguishable from the additional data on the document.

8. The computer-readable storage medium of claim 7, wherein the determining, based on the input, that the additional data is the partial summary of the preexisting data comprises analyzing the preexisting data to determine whether a portion of the additional data is a sum of at least a portion of the preexisting data.

9. The computer-readable storage medium of claim 7, wherein the presenting the preview of the suggested complete summary of the preexisting data comprises determining a plurality of alternate suggested complete summaries of the preexisting data.

10. The computer-readable storage medium of claim 9, wherein the operations further comprise eliminating at least one of the plurality of alternate suggested complete summaries in response to receiving further data associated with the additional data or a user selection of one of the plurality of alternate suggested complete summaries.

11. The computer-readable storage medium of claim 9, wherein the operations further comprise displaying for selection the plurality of alternate suggested complete summaries.

12. The computer-readable storage medium of claim 7, wherein the operations further comprise generating a confidence level for the suggested complete summary.

13. The computer-readable storage medium of claim 12, wherein the operations further comprise increasing the confidence level in response to receiving further additional data.

14. The computer-readable storage medium of claim 12, wherein the operations further comprise updating the preview in response to an update of the confidence level.

15. A system comprising:
   one or more processors; and
   a computer-readable storage medium having computer-executable instructions stored thereupon which, when executed by the one or more processors, cause the one or more processors to perform operations comprising:
      receiving input of additional data at a location on a document that comprises preexisting data contained therein;
      in response to receiving the input of the additional data on the document, determining, based on an analysis of the additional data on the document against the preexisting data on the document, that the additional data is a partial summary of the preexisting data on the document;
      in response to determining that the additional data on the document is the partial summary of the preexisting data on the document, automatically generating a suggested complete summary of the preexisting data that completes the partial summary that includes the additional data on the document;
      presenting a preview of a suggested complete summary of the preexisting data on the document, the presenting of the preview of the suggested complete summary comprises augmenting the additional data at the location on the document with suggested summary data to complete the partial summary that includes the addition data on the document, the suggested summary of the preexisting data being visually distinguished from the additional data on the document;
      receiving an indication of acceptance of the suggested complete summary; and
      in response to receiving the indication of the acceptance of the suggested complete summary, modifying the suggested summary data to be visually indistinguishable from the additional data on the document.

16. The system of claim 15, wherein the operations further comprise presenting alternate suggested complete summaries in response to determining that the additional data is the partial summary of the preexisting data, and wherein the preview of the suggested complete summary of the preexisting data is a suggested complete summary with a highest confidence level.

17. The system of claim 15, wherein the operations further comprise presenting alternate pivot table configurations in response to determining that the additional data is the partial summary of the preexisting data.

18. The computer-implemented method of claim 1, wherein:
   the document comprises a spreadsheet document; and
   the location on the document comprises one or more cells on the spreadsheet document.

19. The computer-implemented method of claim 1, wherein:
   the partial summary that includes the additional data comprises text that corresponds to a first portion of the preexisting data and a summarization of a second portion of the preexisting data; and
   the suggested complete summary includes a further summarization of a third portion of the preexisting data.

* * * * *